United States Patent [19]

Hathaway et al.

[11] Patent Number: 5,584,521
[45] Date of Patent: Dec. 17, 1996

[54] VEHICLE MODULAR RAIL SYSTEM

[75] Inventors: Richard C. Hathaway, Greenville; Mearl K. Bridges, New Madison; Donald R. Klein, Greenville, all of Ohio

[73] Assignee: CR&I Inc., Greenville, Ohio

[21] Appl. No.: 343,181

[22] Filed: Nov. 22, 1994

Related U.S. Application Data

[63] Continuation-in-part of Ser. No. 295,223, Aug. 24, 1994, Pat. No. 5,480,206, which is a continuation of Ser. No. 139,402, Oct. 19, 1993, abandoned, which is a division of Ser. No. 823,308, Jan. 21, 1992, Pat. No. 5,263,761.

[51] Int. Cl.⁶ .................................................. B60P 7/02
[52] U.S. Cl. .............................. 296/36; 296/3; 296/37.6; 296/100; 296/164
[58] Field of Search .................................. 296/3, 32, 34, 296/36, 37.6, 100, 156, 164, 165, 168, 171, 172, 173, 175, 176; 224/273, 281, 310, 321, 326, 400, 402, 403, 404, 405

[56] References Cited

U.S. PATENT DOCUMENTS

| | | | |
|---|---|---|---|
| 3,773,379 | 11/1973 | Loiseau | 296/107 |
| 3,882,575 | 5/1975 | Jolly | 24/661 |
| 3,897,100 | 7/1975 | Gardner | 296/100 X |
| 4,333,678 | 6/1982 | Munoz et al. | 296/39.2 |
| 4,522,326 | 6/1985 | Tuohy, III | 296/37.6 X |
| 4,547,014 | 10/1985 | Wicker | 296/100 |
| 4,592,583 | 6/1986 | Dresen et al. | 296/39.2 |
| 4,615,557 | 10/1986 | Robinson | 296/100 |
| 4,648,649 | 3/1987 | Beal | 296/100 X |
| 4,728,017 | 3/1988 | Mullican | 296/37.6 X |
| 4,730,866 | 3/1988 | Nett | 296/100 |
| 4,740,029 | 4/1988 | Tuerk | 296/100 |
| 4,762,360 | 8/1988 | Huber | 296/100 |
| 4,786,099 | 11/1988 | Mount | 296/98 |
| 4,807,921 | 2/1989 | Champie, III et al. | 296/98 |
| 4,813,735 | 3/1989 | Avitable | 296/100 |
| 4,824,162 | 4/1989 | Geisler et al. | 296/100 |
| 4,832,395 | 5/1989 | Lovaas | 296/100 |
| 4,861,092 | 8/1989 | Bogard | 296/100 |
| 4,923,240 | 5/1990 | Swanson | 296/100 |
| 4,936,724 | 6/1990 | Dutton | 410/110 |
| 4,944,612 | 7/1990 | Abstetar et al. | 296/39.2 |
| 4,986,590 | 1/1991 | Patti et al. | 296/39.2 |
| 5,040,843 | 8/1991 | Russell et al. | 296/98 |
| 5,052,739 | 10/1991 | Irwin | 296/37.6 |
| 5,088,636 | 2/1992 | Barajas | 296/37.6 X |
| 5,152,574 | 10/1992 | Tucker | 296/100 |
| 5,228,736 | 7/1993 | Dutton | 296/100 X |
| 5,310,238 | 5/1994 | Wheatley | 296/100 |
| 5,385,377 | 1/1995 | Girard | 296/36 |

FOREIGN PATENT DOCUMENTS

| 2517269 | 6/1983 | France | 296/100 |
|---|---|---|---|

*Primary Examiner*—Andrew C. Pike
*Attorney, Agent, or Firm*—Killworth, Gottman, Hagan & Schaeff

[57] ABSTRACT

A modular rail system supports accessories on a pickup truck bed. The system comprises first and second rail assemblies overlying the top surfaces of the first and second truck bed side walls for releasably connecting with the side walls. A flexible cover overlies the bed for covering and providing protection for the bed. A locking mechanism is likewise provided and is associated with the cover and the rail assemblies for lockingly attaching the cover to the rail assemblies and securing the cover in place over the truck bed. The first and second rail assemblies include first and second elongate members having at least one outboard elongated channel and at least two inboard elongated channels for receiving a mating portion of an accessory or an attachment for an accessory. The rail system may additionally include a decorative strip, light strip, protective cap, tie-down bar, light bar, utility box, camper top, and single or multi-piece bed liner, airfoiler, headache rack cab protection attachment, simulated roll bar, portable work bench, liquid storage tank, cargo compartment, advertising panel, ice chest, and various types of racks (motorcycle, bicycle, ski, ladder, etc.) or tracks for slidably receiving a hard shell, hard tonneau cover, camper top, or other accessory, each of which is supported by mating portions or attachments received in the elongated channels in the elongate members making up the rail assemblies.

9 Claims, 19 Drawing Sheets

VEHICLE MODULAR RAIL SYSTEM

CROSS-REFERENCE TO RELATED APPLICATIONS

This is a continuation-in-part of application Ser. No. 08/295,223, now U.S. Pat. No. 5,480,206, filed Aug. 24, 1994 as a continuation of application Ser. No. 08/139,402, filed Oct. 19, 1993, now abandoned, which in turn is a division of application Ser. No. 07/823,308, filed Jan. 21, 1992, now U.S. Pat. No. 5,263,761, which is hereby incorporated by reference.

BACKGROUND OF THE INVENTION

The present invention relates generally to a vehicle modular rail system for a bed portion of a vehicle and, more particularly, to a vehicle modular rail system for supporting accessories on the bed of a pickup truck.

Accessories, such as tonneau covers, light bars, utility boxes, and the like, have been used in the past with pickup trucks. Such accessories are normally secured in place by fasteners which are oftentimes affixed through openings drilled into the truck bed side members. Those openings, however, have been found to be problematic since the areas surrounding the openings are susceptible to the formation of rust. Furthermore, if use of a particular accessory is no longer desired, the openings remain in the truck bed side members after the cover is discarded unless filled or otherwise repaired.

Accordingly, a need exists for a vehicle modular rail system for supporting pickup truck bed accessories without affixing any fasteners through openings in the truck bed side walls. Furthermore, a need exists for a single, versatile system which is capable of accommodating a number of different accessories, thereby allowing one or more desired accessories to be easily mounted onto a pickup truck bed.

SUMMARY OF THE PRESENT INVENTION

The present invention addresses the limitations of the prior art by providing a vehicle modular rail system for supporting various pickup truck bed accessories without requiring any fasteners to be affixed through openings in the truck bed side walls. The present invention also accommodates a number of different accessories, thereby allowing one or more desired accessories to be easily mounted onto a pickup truck bed.

In accordance with a first aspect of the present invention, a modular rail system is provided for supporting accessories on a pickup truck bed including a front wall, an end wall, and opposing first and second side walls. The system comprises first and second elongated rail assemblies.

Each of the first and second rail assemblies has at least one elongated member which may be a fill rail attached to a base rail, or a unitary fill rail/base rail, having an outer surface including at least one elongated channel (outboard channel) located therein. The outboard channels of the first and second rail assemblies are used to support various accessories on the truck bed. For example, the outboard channels may define an opening in the outer surface of the elongate members and serve to receive a decorative strip therein which is visible through the opening in the outer surface of the members. Alternatively, the outboard channels may receive a light strip which is likewise visible through the opening in the outer surface of the member, a protective rail cap, a mating portion of a tie-down bar for connecting the tie-down bar to the elongated member, a mating portion of a cab extender for connecting the cab extender to the elongated member, a mating portion of simulated roll bar, a mating portion of a headache rack cab protection system, a mating portion of a ski/surfboard or bicycle rack, a mating portion for an airfoiler, etc. The elongate member preferable also has an inner surface including at least one, and preferably two, elongate channels (inboard channels) therein. The inboard channels are used to support various accessory items in addition to or instead of those supported by the outboard channel(s). For example an inboard channel or combination of inboard channels may define an opening or openings on the inner surface of the elongate members and serve to receive the mating portion of an attachment for an advertising panel, a ladder rack, a portable work bench, or a motorcycle rack, or may serve to receive the mating portion of a side mounted cargo component, an ice chest, or a heavy duty tie-down ring, or may receive a track slide for a hard shell, a hard tonneau cover, a camper top, etc.

Each of the first and second rail assemblies may also have an additional elongated member, which may be termed a cap rail, having an outer surface including at least one elongated channel (outboard channel) formed therein. The outboard channel defines an opening in the outer surface of the cap rail and serves to receive a tonneau cover or a decorative strip therein which is visible through the opening in the outer surface of the cap rail. Finally, the cap rail also has an inner surface which may have at least one elongated (inboard) channel formed therein. The inboard channel of the cap rail may be used to support cross bar members used with the tonneau cover.

The rail system may further comprise a single-piece or multi-piece bed liner which is capable of being connected to or retained by the first and second rail assemblies. A decorative strip, light strip, protective rail cap, tie-down bar, camper top, utility box, airfoiler, headache rack cab protection attachment, simulated roll bar, cab extender, portable work bench, cargo compartment, advertising panel, ice chest, various types of racks (motorcycle, bicycle, ski, ladder, etc.) or tracks for slidably receiving a hard shell, hard tonneau cover, camper top, or other accessory may additionally form a part of the system and each may connect with the first and second rail assemblies.

The rail system preferably further comprises a flexible cover means (tonneau cover) having a front edge, an end edge, and first and second side edges, and positioned over the bed of the truck for covering the same. Further provided is attachment means associated with the first and second rail assemblies and the cover means for lockingly attaching the cover means to the first and second rail assemblies in position over the bed.

In a first attachment means embodiment of the present invention, the attachment means comprises a plurality of cross bar members which extend across the bed and lockingly connect with an inner portion of the first and second cap rails and means located on the underside of the flexible cover means for joining the flexible cover means to the plurality of cross bar members, thereby securing the flexible cover means to the cross bar members.

In a second attachment means embodiment of the present invention, the attachment means comprises a plurality of rail snap elements fixedly connected to the first and second cap rails, and a plurality of cover snap elements fixedly connected along at least a portion of the periphery of the flexible cover means. Each of the cover snap elements is capable of fastening with a corresponding rail snap element to attach the cover means to the first and second cap rails. Also provided are means for locking the cover snap elements in fastened engagement with the rail snap elements, thereby securing the cover means to the first and second cap rails.

According to preferred embodiments, it is an object of the present invention to provide a modular rail system for supporting accessories on a pickup truck. It is a further object of the present invention to provide an improved cover assembly for the cargo area of a vehicle, such as a pickup truck, which allows for quick and simple installation, high security, and easy access to the cargo area of the vehicle. It is another object of the present invention to provide a tonneau cover arrangement for covering and protecting the bed of a pickup truck wherein the arrangement includes a support rail assembly and attachment means for lockingly connecting a tonneau cover to the support rail assembly. It is an additional object of the present invention to provide a modular rail system for the bed of a pickup truck wherein the system may include a decorative strip, light strip, protective rail cap, utility box, camper top, airfoiler, headache rack cab protection attachment, cab extender, simulated roll bar, portable work bench, cargo compartment, advertising panel, ice chest, and various types of racks (motorcycle, bicycle, ski/surfboard, ladder, etc.) or tracks for slidably receiving a hard shell, hard tonneau cover, camper top, and other accessory as well as a single-piece or multi-piece bed liner, each of which is capable of being supported and connected to first and second rail assemblies. It is yet an additional object of the present invention to provide a modular rail system for protecting the side wall top surfaces of the bed of a pickup truck. These and other objects and advantages of the invention will be apparent from the following description, the accompanying drawings and the appended claims.

DETAILED DESCRIPTION OF THE INVENTION

Figure 1:
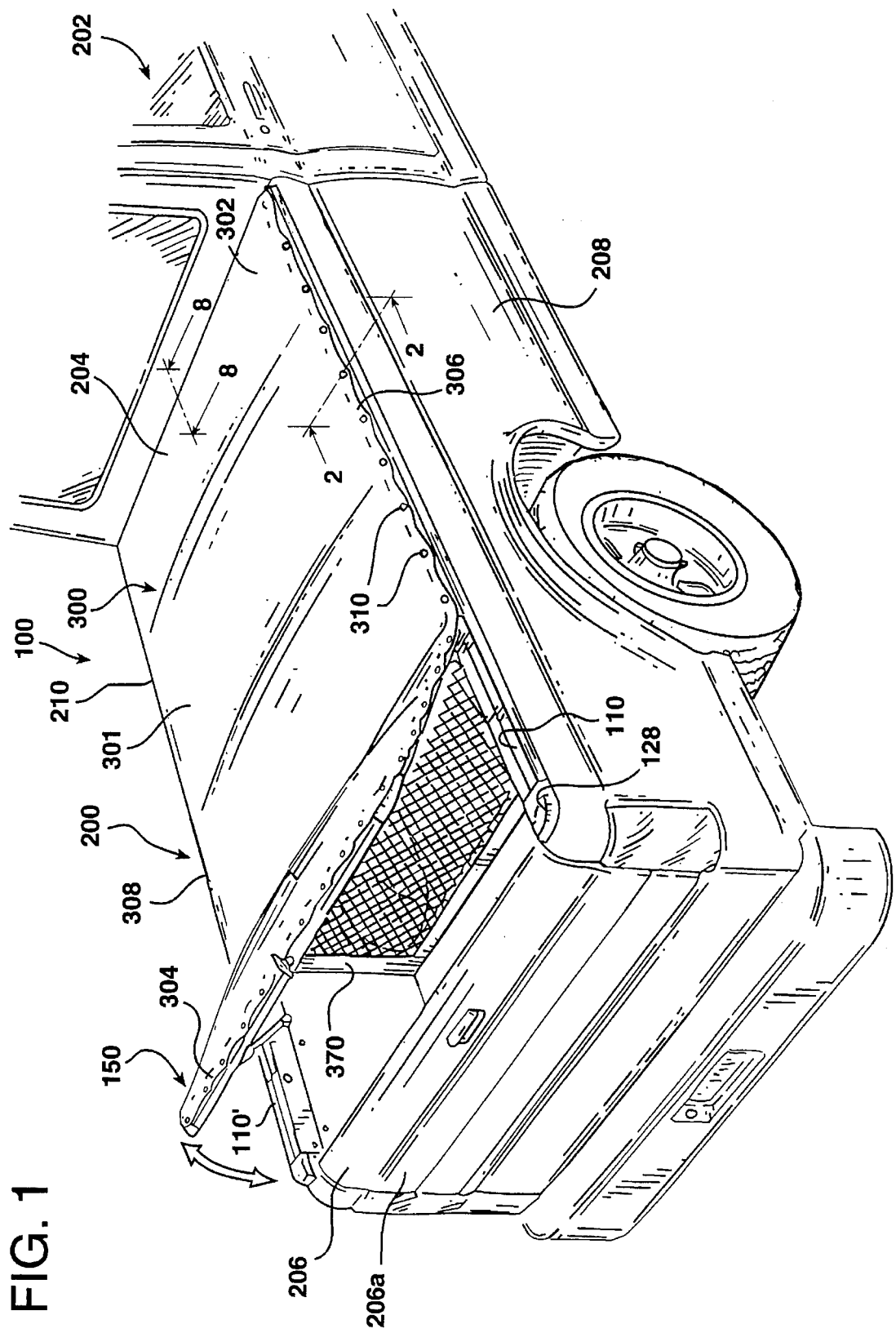
FIG. 1 is a perspective view of the modular rail system of the present invention mounted onto the bed of a pickup truck.

The modular rail system of the present invention, generally designated by the reference numeral 100, is shown in FIG. 1 mounted to a bed 200 of a pickup truck 202. The truck bed 200 includes a front wall portion 204, a rear wall portion 206, formed by tailgate 206*a*, and opposing first and second side wall portions 208 and 210, respectively. Each of the first and second side wall portions 208 and 210 includes a top surface (see e.g. top surface 208a in FIG. 2). Rail means 110 and 110' are positioned over the top surface of the first side wall portion 208 and the top surface of the second side wall portion 210, respectively, for releasably connecting with the first and second side wall portions 208 and 210 of the pickup truck. By releasably connecting with the side wall portions 208 and 210 of the truck 202, the rail means 110 and 110' act to releasably connect the rail system 100 to the pickup truck bed 200 without affixing any fasteners through openings in the truck bed 200 or otherwise damaging the bed 200 to secure the rail system 100 thereto. Alternatively, the rail means 110 and 110' may be formed as an integral part of the wall portions 208 and 210 of the pickup truck 202.

Figure 2:
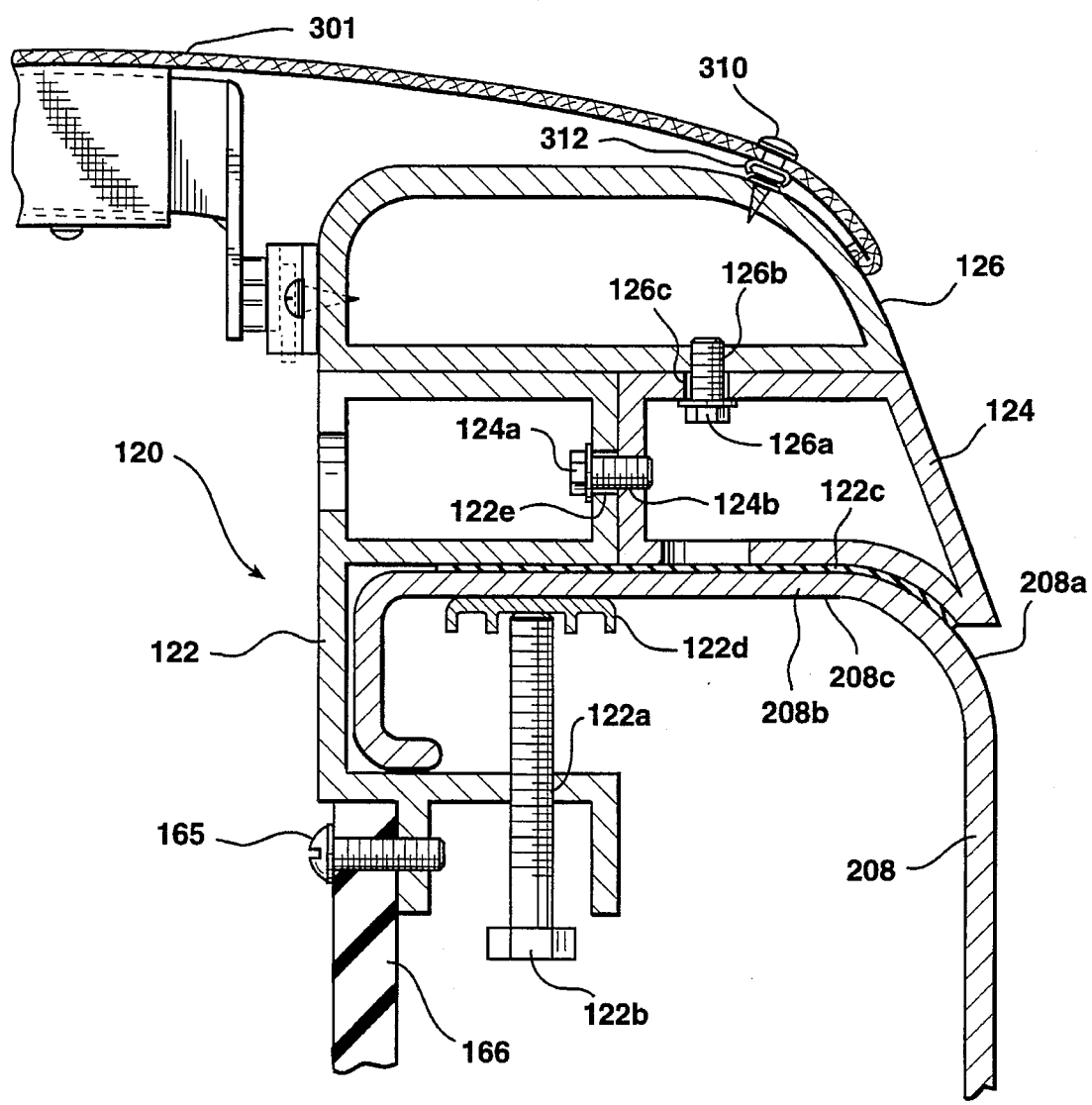
FIG. 2 is a cross-sectional view of a first embodiment of the first rail assembly taken generally along section line 2—2 in FIG. 1.

Referring to FIG. 2, which is a cross-sectional view of the first embodiment of the rail means 110 in the form of a first rail assembly 120 (the second rail means 110' being in the form of a second rail assembly which is a mirror image of the first) of the rail system 100, the first rail assembly 120 includes a first base rail 122 having one or more openings 122a therein for threadingly receiving one or more bolts 122b or like fasteners. Each bolt 122b, upon being threaded upward within corresponding opening 122a, acts to clamp the base rail 122 to an extended portion 208b of the first side wall portion 208. Positioned intermediate the top surface 208a of the first side wall 208 and the base rail 122 is a first, upper protective strip 122c. Positioned intermediate a lower surface 208c of the first side wall portion 208 and the bolts 122b is a lower support plate 122d.

The first rail assembly 120 further includes a first fill rail 124 which overlies the protective strip 122c and is positioned adjacent to the first base rail 122. One or more bolts 124a or like fasteners pass through openings 122e in the base rail 122 and threadingly engage with openings 124b in the fill rail 124 to connect the fill rail 124 with the base rail 122. Located above the first base rail 122 and the first fill rail 124 is a first cap rail 126. The cap rail 126 is connected to the fill rail 124 by one or more bolts 126a or like fasteners which pass through openings 124c in the fill rail 124 and threadingly engage with openings 126b in the cap rail 126. Alternatively, the cap rail 126 could be connected to either the base rail 122 alone or to both the fill rail 124 and the base rail 122. End caps 128 (see FIG. 1) are also provided for closing off the end portions of the base rail 122 and the fill rail 124.

The second rail assembly is substantially the same as the first rail assembly 120.

It is further contemplated that the rails 122, 124, and 126 of the first rail assembly, and the corresponding rails of the second rail assembly, could be interconnected by interlocking means (not shown) rather than by bolts. The interlocking means would comprise one or more projections on a first rail member which would engage and lock with a corresponding recess or opening in a second rail member to join the two rail members to one another. It is additionally contemplated that the rails of two rail assemblies could be welded to one another, or formed together as a single unit.

Figure 14:
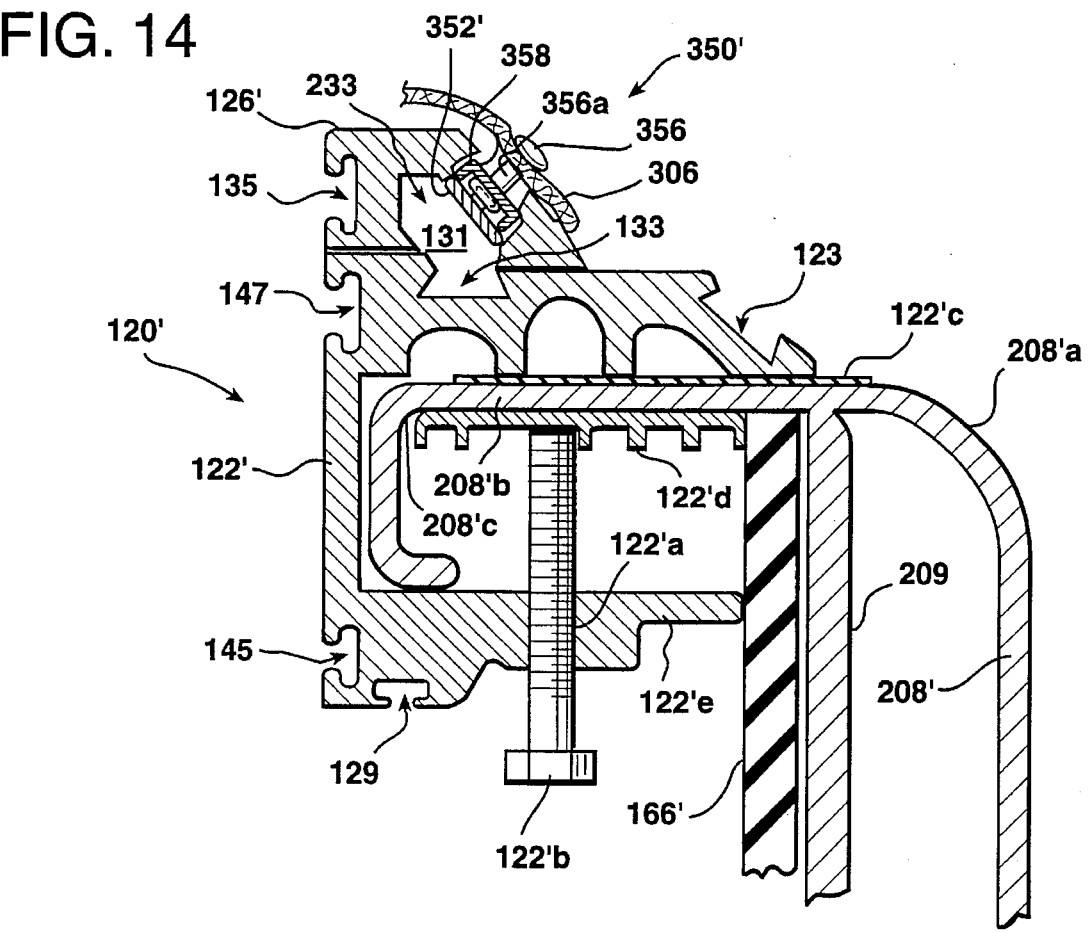
FIG. 14 is a cross-sectional view similar to that of FIG. 2 showing a second embodiment of the first rail assembly.
Figure 15:
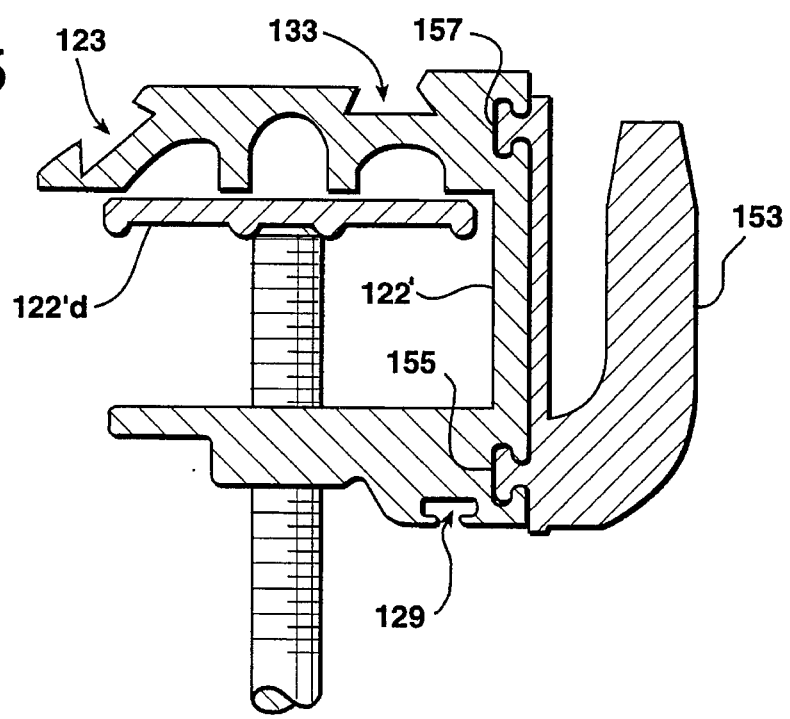
FIG. 15 is a cross-sectional view of the second embodiment of the rail assembly, without a cap rail, but having a mating portion of an attachment for an advertising panel (FIG. 16), a motorcycle rack (FIG. 17), a ladder rack (FIG. 18), and a portable work bench (FIG. 19) in the inboard channels of the unitary fill rail/base rail.
Figure 16:
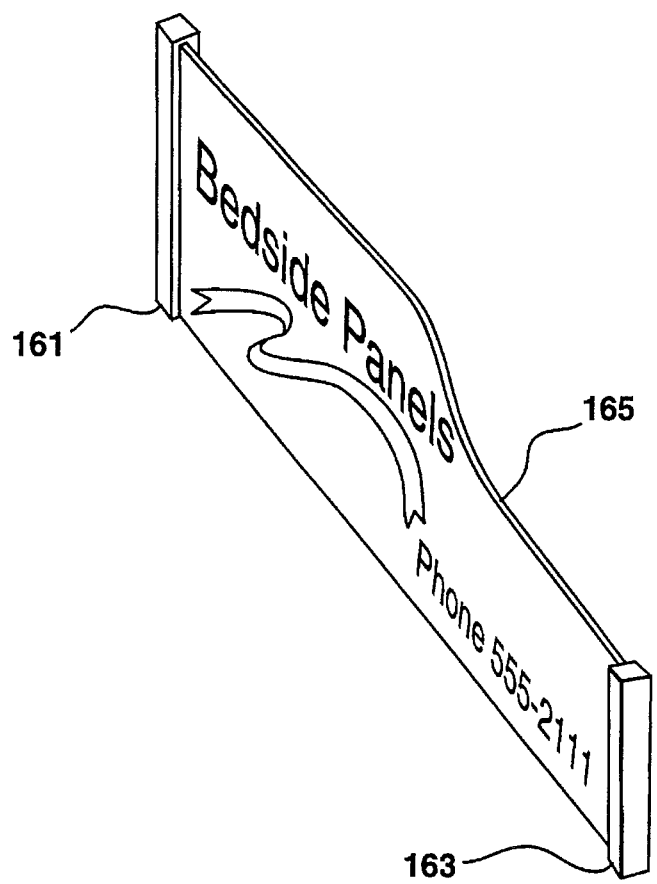
Figure 17:
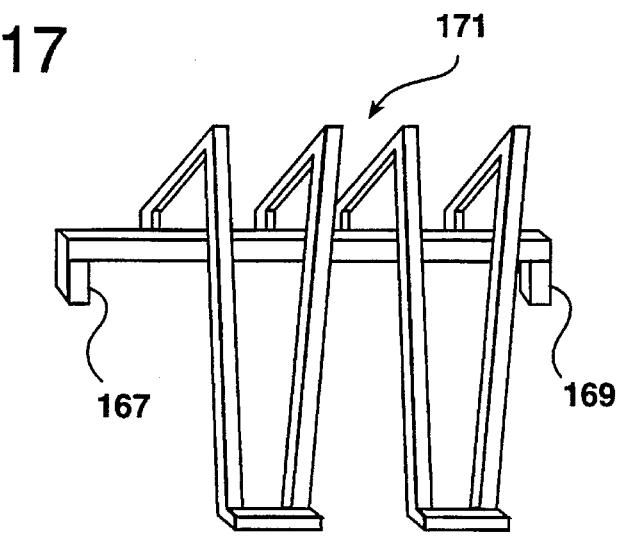
Figure 18:
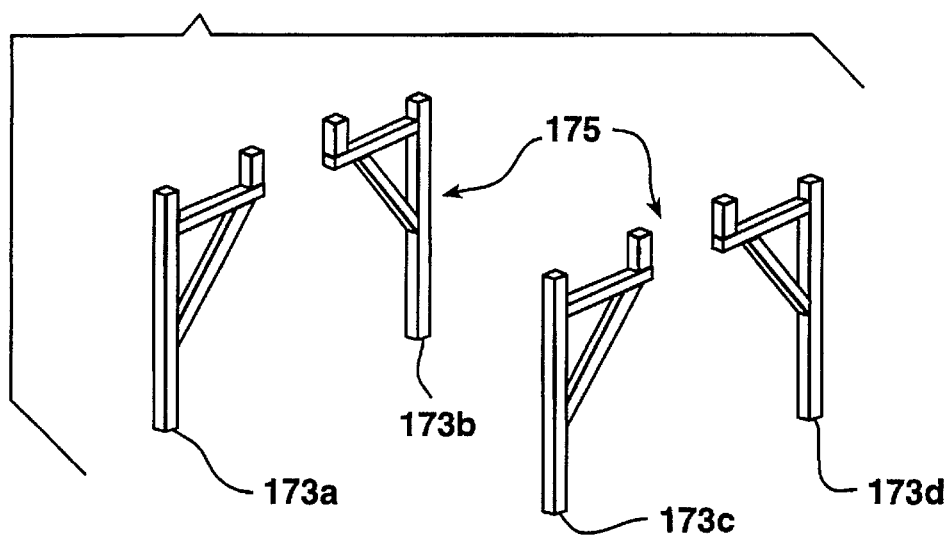
Figure 19:
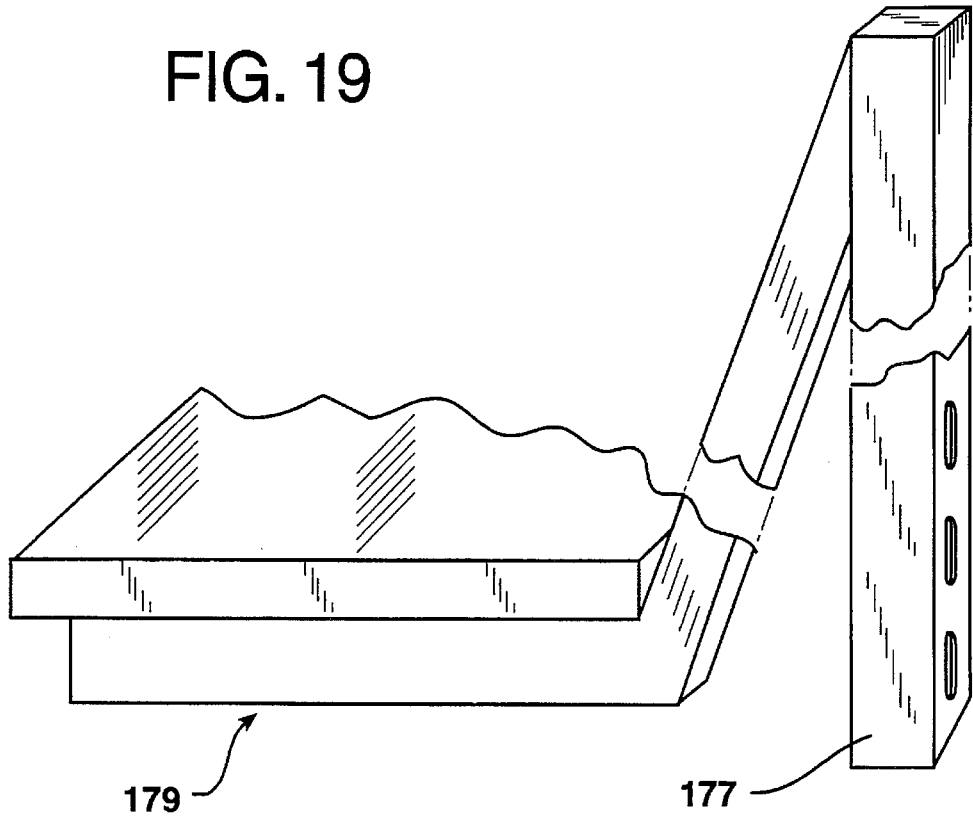
Figure 20:
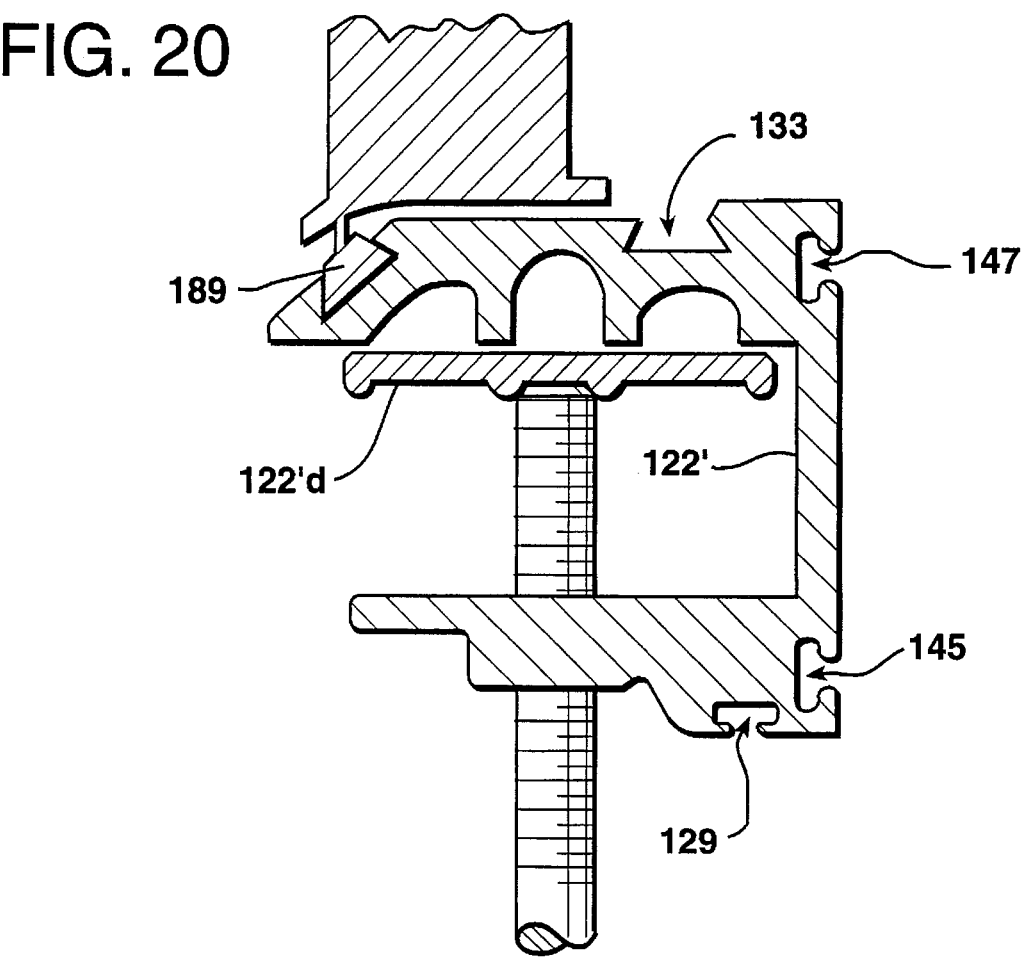
FIG. 20 is a cross-sectional view of the second embodiment of the rail assembly, without a cap rail, but having a mating portion for a simulated roll bar (FIG. 21), a headache rack cab protection system (FIG. 22), a cab extender (FIG. 23), and an airfoiler (FIG. 24) in the outboard channel of the unitary fill rail/base rail.
Figure 21:
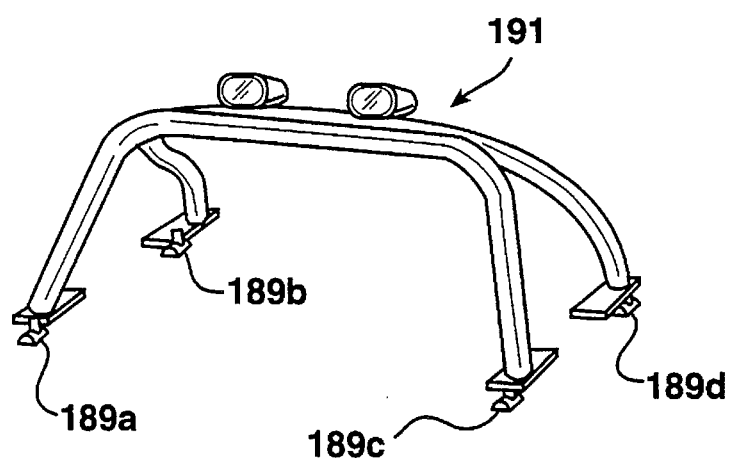
Figure 22:
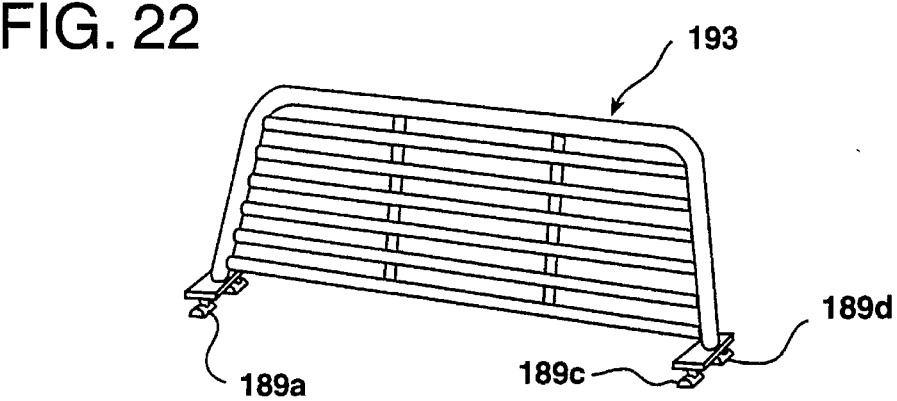
Figure 23:
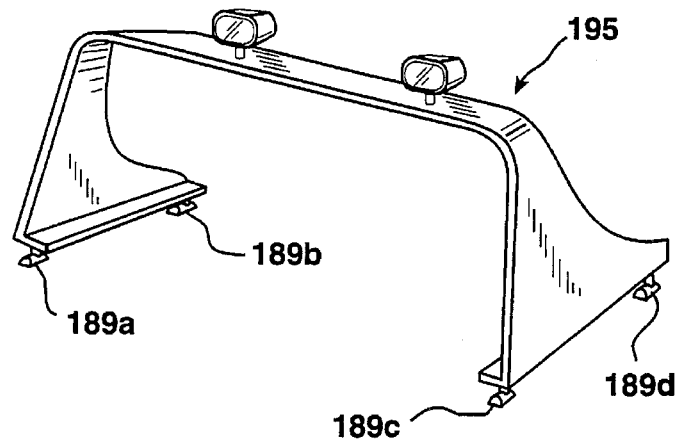
Figure 24:
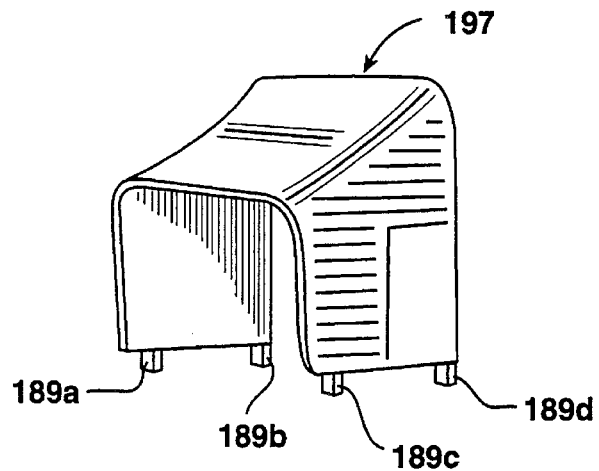

Essentially such a single unit rail assembly is shown in FIG. 14, where there is shown a cross-sectional view of a second embodiment of the first rail assembly 120' (the second rail assembly being a mirror image thereof) of the rail system 100, the first rail assembly 120' includes a unitary fill rail/base rail 122' having one or more openings 122'a therein for threadingly receiving one or more bolts 122'b or like fasteners. Each bolt 122'b, upon being threaded upward within corresponding opening 122'a, acts to clamp the unitary fill rail/base rail 122' to an extended portion 208'b of the first (outer) side wall 208' and second (inner) side wall 209. Positioned intermediate the top surface 208'a of the first side wall 208' and the unitary fill rail/base rail 122' is an upper protective strip 122'c. Positioned intermediate a lower surface 208'c of the first side wall portion 208' and the bolts 122'b is a lower support plate 122'd.

Figure 25:
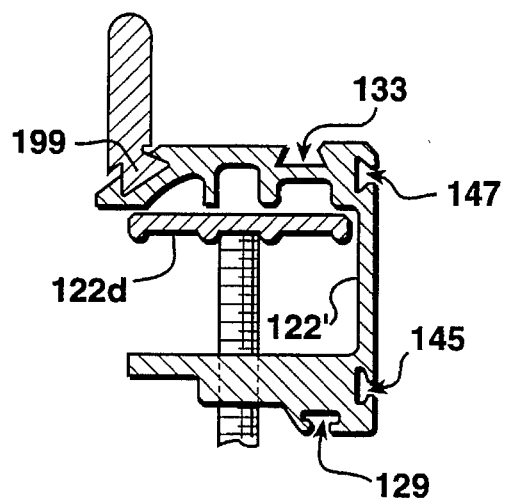
FIG. 25 is a cross sectional view of the second embodiment of the rail assembly, without a cap rail, but having a mating portion of a tie-down member (FIG. 26) in the outboard channel of the unitary fill rail/base rail.
Figure 26:
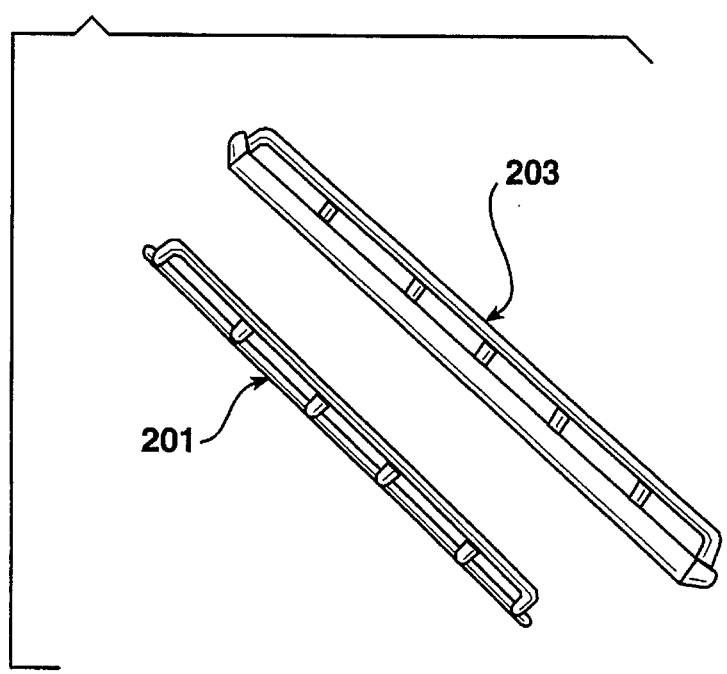
Figure 27:
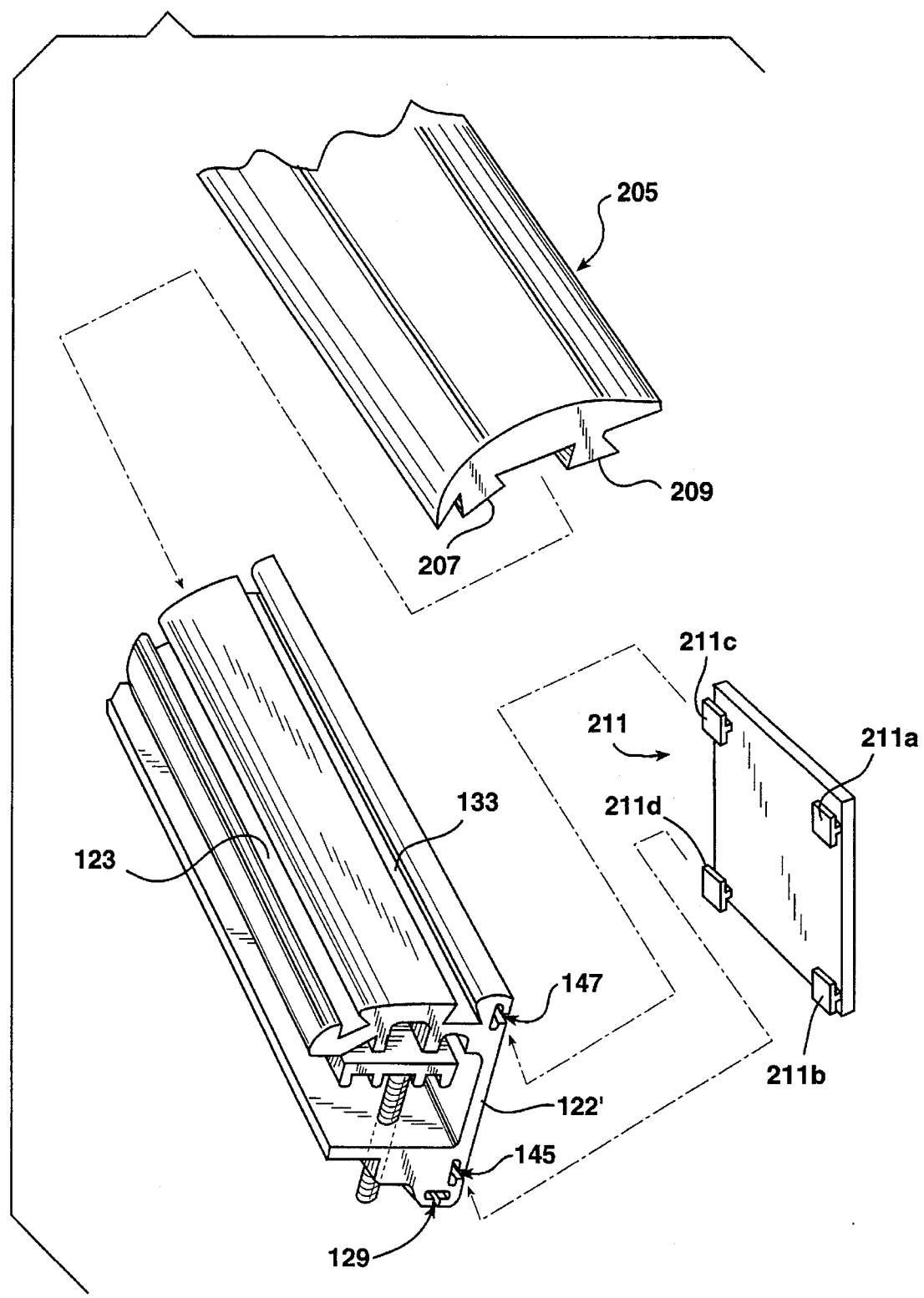
FIG. 27 is an exploded, perspective view of a portion of the second embodiment of the rail assembly, without a cap rail, but having a protective rail cap instead and having mating portions for a heavy duty tie-down ring in the inboard channels of the unitary fill rail/base rail.
Figure 30:
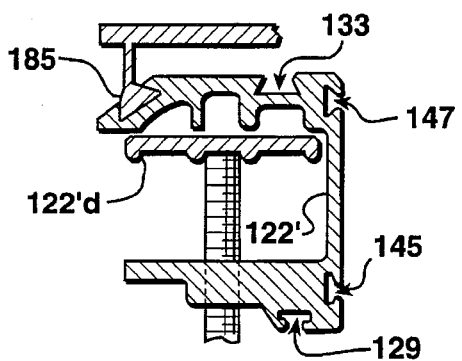
FIG. 30 is a cross-sectional view of the second embodiment of the rail assembly, without a cap rail, but having a mating portion of a bicycle rack (FIG. 31) and a ski or surfboard rack (FIG. 32) in the outboard channel of the unitary fill railbase rail.
Figure 31:
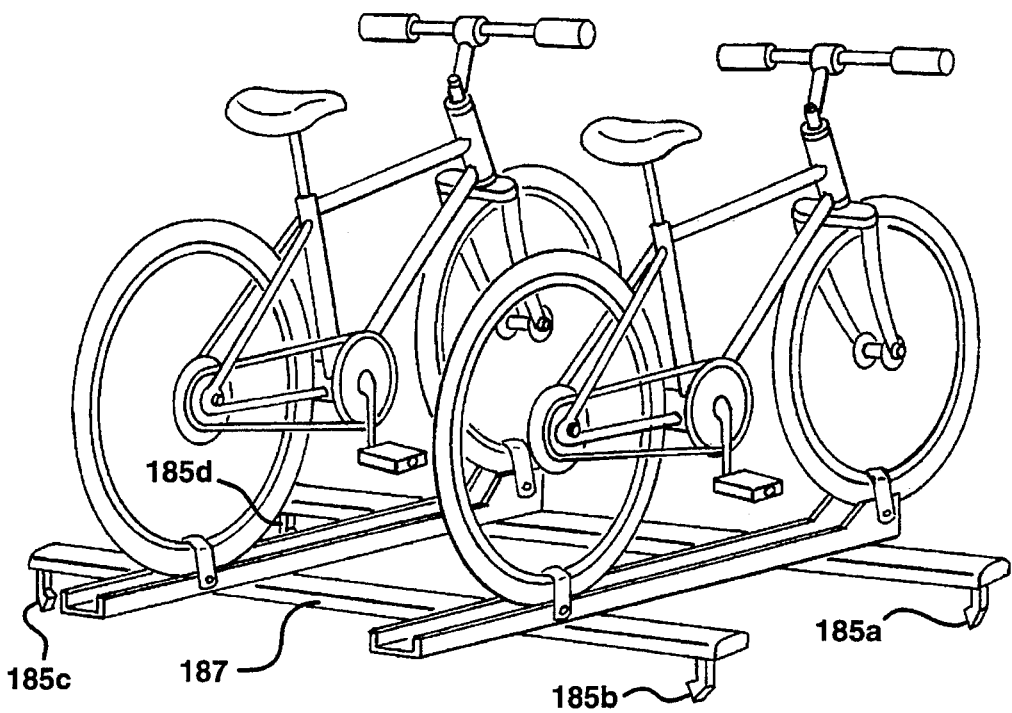
Figure 32:
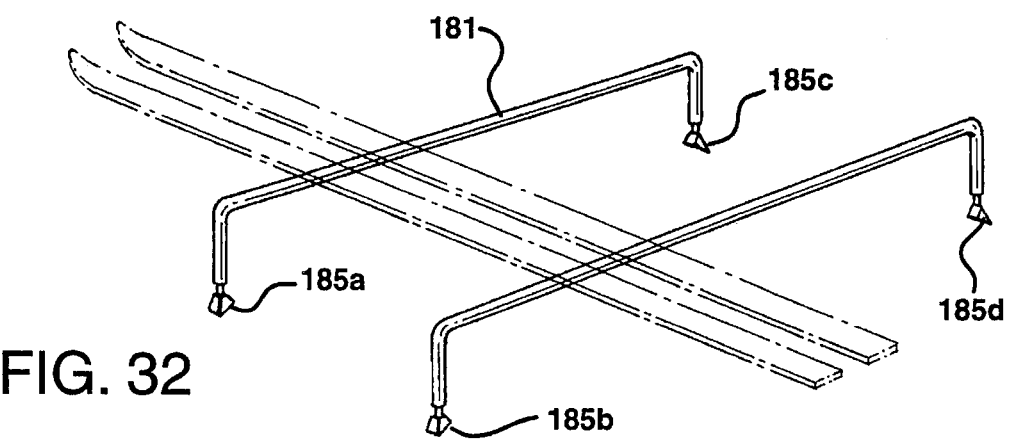
Figure 33:
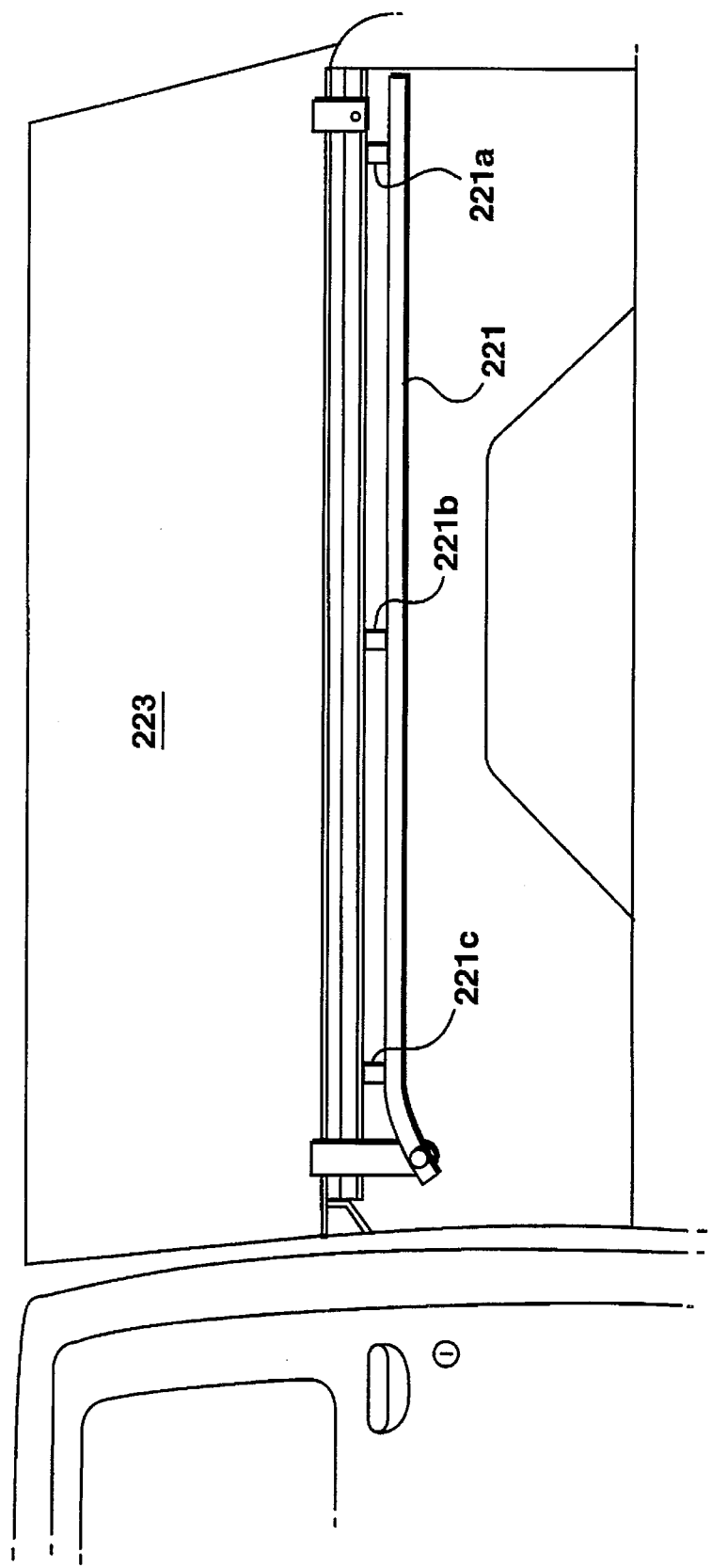
FIG. 33 is a section, viewed from the inside, of a pickup truck bed having a rail assembly as in FIG. 14, with a track for slidably receiving a hard shell, hard tonneau cover, camper top, or other accessory, attached to a channel in the unitary fill rail/base rail.

The unitary fill rail/base rail 122' has at least one elongate channel 123 which is an outboard channel and which serves to receive an accessory such as a decorative strip; a light strip; a tie-down member as better shown in FIGS. FIGS. 25 and 26; a protective rail cap as better shown in FIG. 27; a mating portion of a simulated roll bar, headache rack cab protector, cab extender, or airfoiler as better shown in FIGS. 20–24; or the mating portion of a ski/surfboard or bicycle rack as better shown in FIGS. FIGS. 30–32. The unitary fill rail/base rail 122' also has at least one elongated channel and preferably two elongated channels 145 and 147 which are inboard channels and which receive an accessory such as a mating portion of an attachment for an advertising panel, a motorcycle rack, a ladder rack, and a portable work bench as better shown in FIGS. 15–19. Finally, the unitary fill rail/ base rail 122' has an elongated channel 129 which can be used when attaching a track slide for a hard shell, a hard tonneau cover, a camper top, etc. as shown in FIG. 33.

As shown in FIG. 14, a cap rail 126' is attached to unitary fill rail/base rail 122' by a locking bar (not shown) which fits into channel 131 which is formed by channel 233 in cap rail 126' and channel 133 in unitary fill rail/base rail 122' when cap rail 126' is placed on top unitary fill rail/base rail 122'. Cap rail 126' has at least one elongated channel 352' which is an outboard channel and which serves to receive an attachment means 350' for locking attachment of a tonneau cover as better shown in FIGS. 11–12. Cap rail 126' also has at least one elongated channel 135 which is an inboard channel and which can be used to support cross bar members 322 (see FIG. 9).

Figure 3:
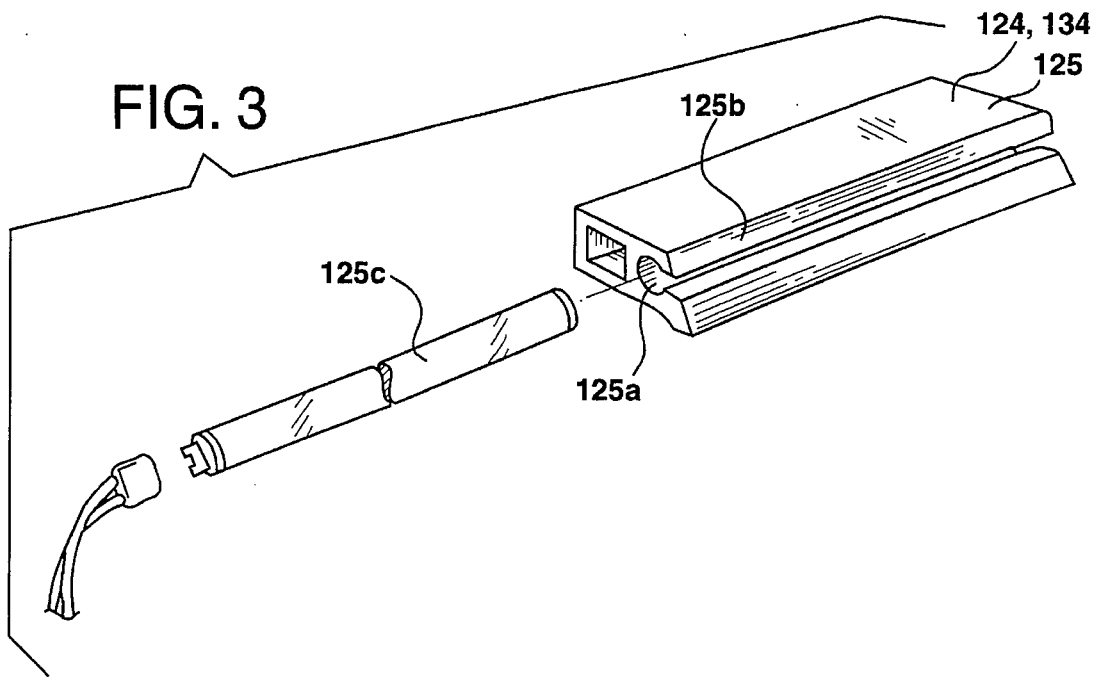
FIG. 3 is an exploded, perspective view of a portion of a fill rail having a channel and a light strip capable of being received within the channel.
Figure 4:
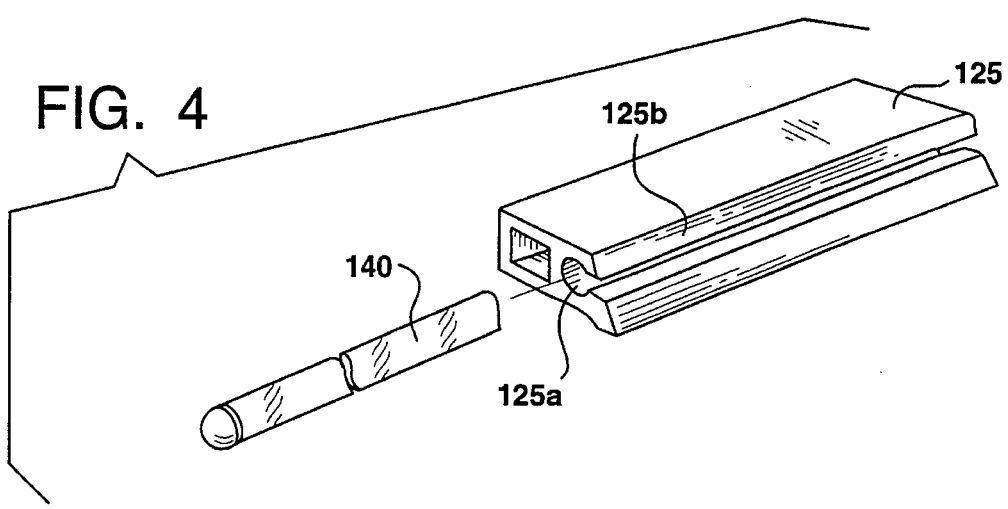
FIG. 4 is an exploded, perspective view of a portion of a fill rail having a channel and a decorative strip capable of being received within the channel.
Figure 5:
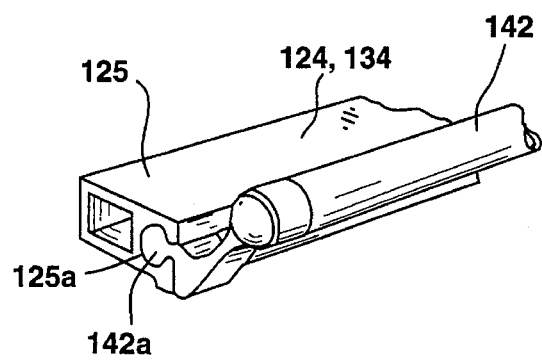
FIG. 5 is a partial, perspective view of a fill rail including a mating support member of a tie-down member received within its channel.

Referring now to FIG. 3, each of the first and second fill rails, such as fill rail 124, is preferably an elongated member such as elongated member 125 for fill rail 124 having an outboard elongated channel such as elongated channel 125a located therein. Channel 125a defines an opening in the outer surface 125b of the elongated member 125 and receives a light strip 125c therein, as shown in FIG. 3, which is visible through the opening in the outer surface 125b. The light strip 125c is connected to the truck's 202 electrical system in a known manner for receiving electrical energy for purposes of illumination. The channel 125a may alternatively receive a decorative strip 140, as shown in FIG. 4, or a mating support member 142a of a tie-down member 142, as shown in FIG. 5. When a unitary fill rail/base rail such as unitary fill rail/base rail 122' is used, outboard channel 123 serves the same purpose.

Figure 6:
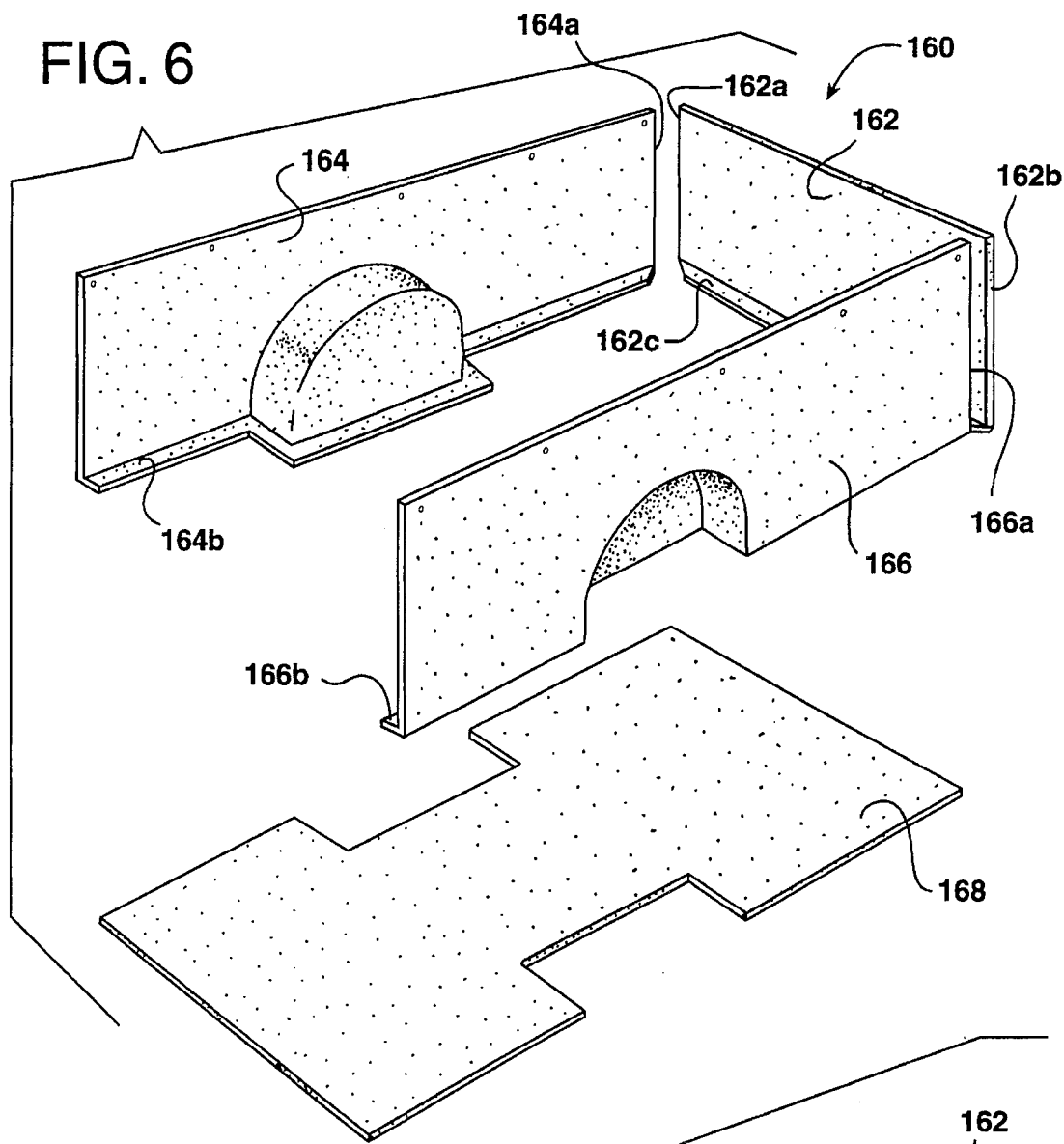
FIG. 6 is an exploded, perspective view of a multipiece bed liner which forms part of the system of the present invention.

A multi-piece bed liner 160 is preferably provided within the truck bed 200 for protecting the bed 200 against damage caused by cargo stowed therein. As shown in FIG. 6, the multi-piece bed liner 160 comprises a front section 162, first and second side sections 166 and 164, respectively, and a floor section 168. The floor section 168 is preferably formed from a nonslip material, which may be a different material from that used for the front and side sections. End portions 162a and 162b of the front section 162, end portion 166a of the first side section 166, and end portion 164a of the second side section 164 are shown in FIG. 6 having substantially straight edges. While not shown in FIG. 6, front section 162 is joined with the end portions 166a and 164a of the first and second side sections 166 and 164 via clamps, adhesive tape, or other conventional securing means.

Figure 7:
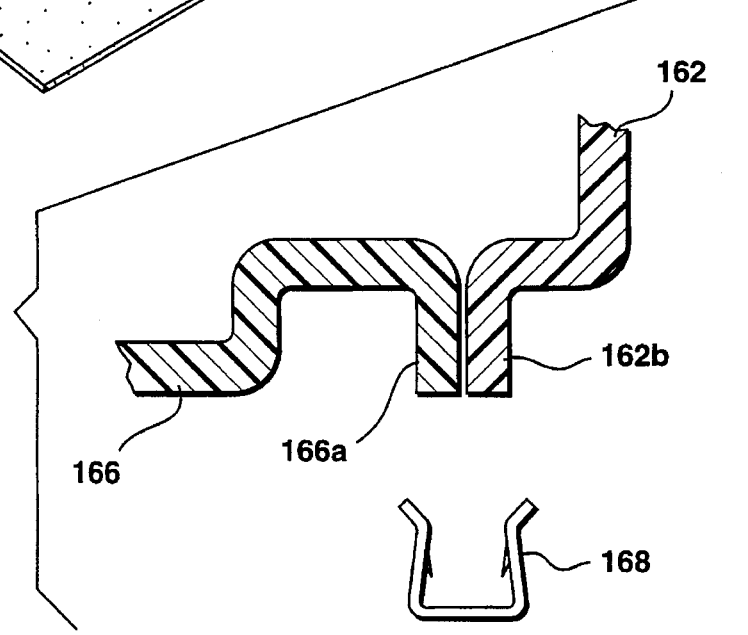
FIG. 7 is an enlarged cross sectional view of an end portion of a front section and an end portion of a side section of a multi-piece bed liner and a clip for connecting the two portions together.

It is further contemplated that end portions 162a and 162b of the front section 162, and end portions 166a and 164a of the side sections 166 and 164 may be formed having a C-shape. For example, FIG. 7 shows end portions 166a and 162b having a C-shape. A metal clip 168 is also shown for joining the end portions 166a and 162b to one another to provide strength and rigidity to the corners. It is additionally contemplated that the sections 162, 164, 166, and 168 of the liner 160 may be formed having a shape which substantially resembles that of an actual truck bed, i.e., they include all of the curves and valleys of a truck bed. It is further contemplated that a single-piece bed liner (not shown) may be employed in place of the multi-piece bed liner 160.

As shown in FIG. 6, the front section 162 of the liner 160 includes an L-shaped base portion 162c, and the first and second side sections 166 and 164 likewise include L-shaped base portions 166b and 164b, respectively. The floor section 168, when positioned within the truck bed 200, overlies the base portions 162c, 166b, and 164b and is joined thereto via tape or like securing means (not shown).

As shown in FIGS. 2 and 14, the multi-piece bed liner 160 may be connected directly to the rail means 110 by for example bolts 165 or like fasteners which pass through the side section 166 in the first embodiment shown in FIG. 2 or by having side section 166' wedged between inner wall 209, plate 122'd, and extended portion 122'e of the unitary fill rail/base rail 122' in the second embodiment shown in FIG. 14. Consequently, fasteners which must be affixed through openings drilled into the bed 200 are not necessary for securing the liner 160 to the truck bed 200. Still, because the bed liner is secured to or by the rail assembly, aggregate cargo cannot get trapped between the liner and the truck bed. Likewise, the firm hold of the liner prevents the "sanding" of paint off the truck bed floor, an action which is caused by the unanchored movement of the liner within the truck bed.

Referring again to FIG. 1, flexible cover means 300 is positioned over the truck bed 200 to cover and protect the bed 200 from theft, vandalism, and the environment. The flexible cover means 300 comprises a protective cover 301, also referred to herein as a tonneau cover, having a front edge 302, an end edge 304, and first and second side edges 306 and 308. The cover 301 is formed from waterproof cloth or like material.

Figure 9:
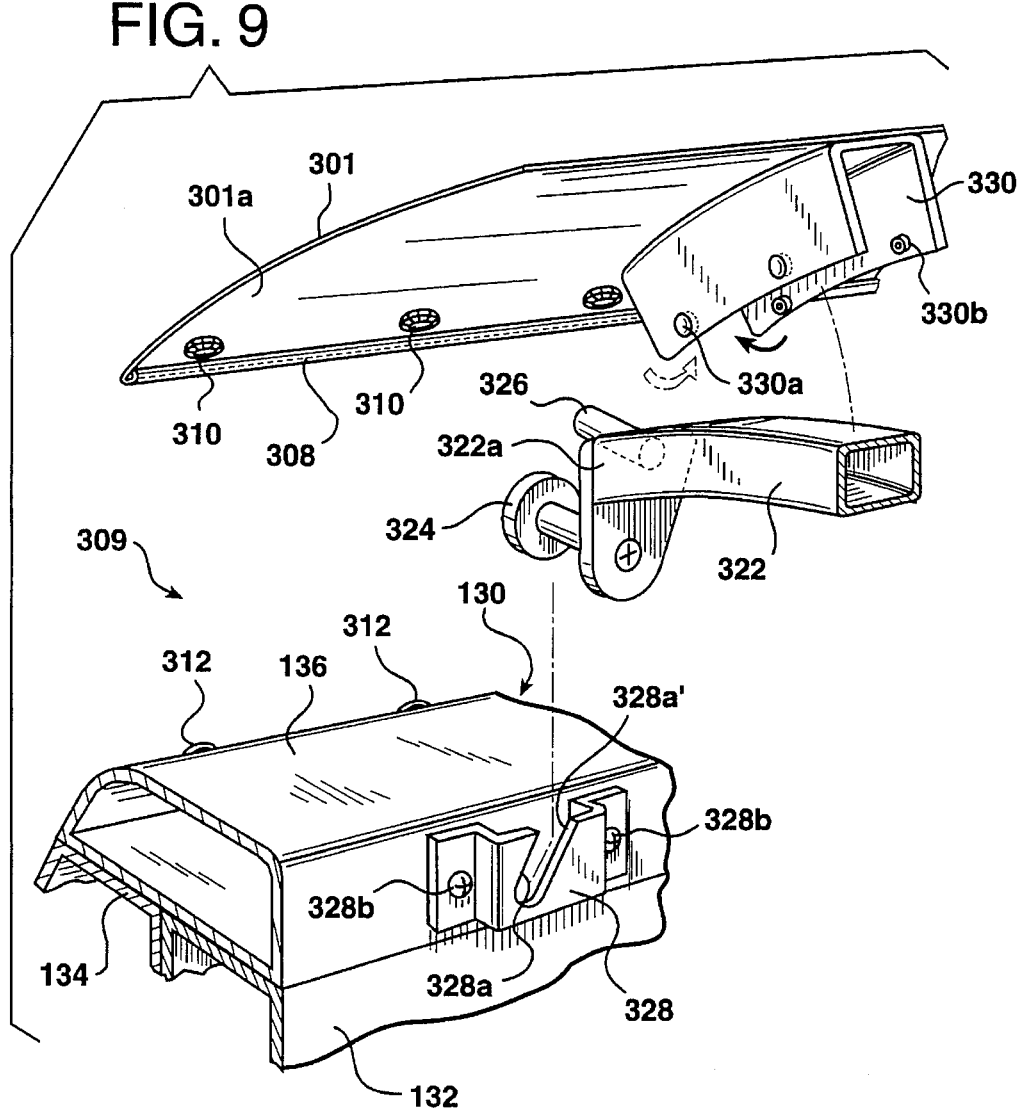
FIG. 9 is an exploded, perspective view of attachment means of a first attachment means embodiment of the present invention showing one end of a cross bar member and an attachment bracket having an angled slot for receiving locking pins of the cross bar member.
Figure 10:
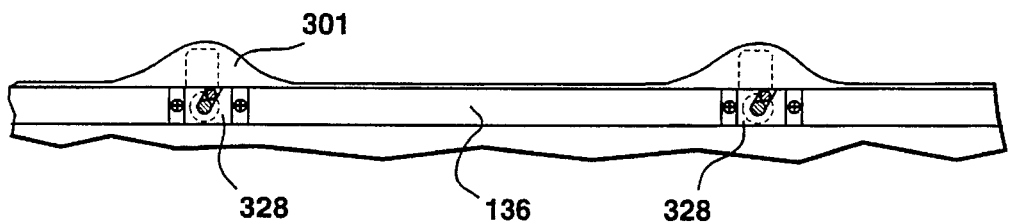
FIG. 10 is a partial, side view of attachment means of the first attachment means embodiment of the present invention with the first rail assembly removed and showing in cross-section locking pins of cross bar members.

Attachment means 309 of the first attachment means embodiment, shown best in FIG. 9, is provided for removably attaching the protective cover 301 to the rail means 110. The attachment means 309 includes a plurality of cover snap elements 310 fixedly attached to edges 304, 306, and 308 of the cover 301 (see also FIG. 1) for fastening with corresponding rail snap elements 312 fixedly positioned along the first and second cap rails. The cover snap elements 310 and the rail snap elements 312 serve to attach the cover 301 to the first and second cap rails. Preferably, the cover elements 310 are female snap elements while the rail elements 312 are male snap elements. Both male and female snap elements are conventional and well known in the art. FIG. 9 also illustrates, in part, the second rail assembly 130 which is substantially the same as the first rail assembly 120 as shown in FIG. 2. As shown, second rail assembly 130 includes a second base rail 132, a second fill rail 134, and a second cap rail 136.

Figure 8:
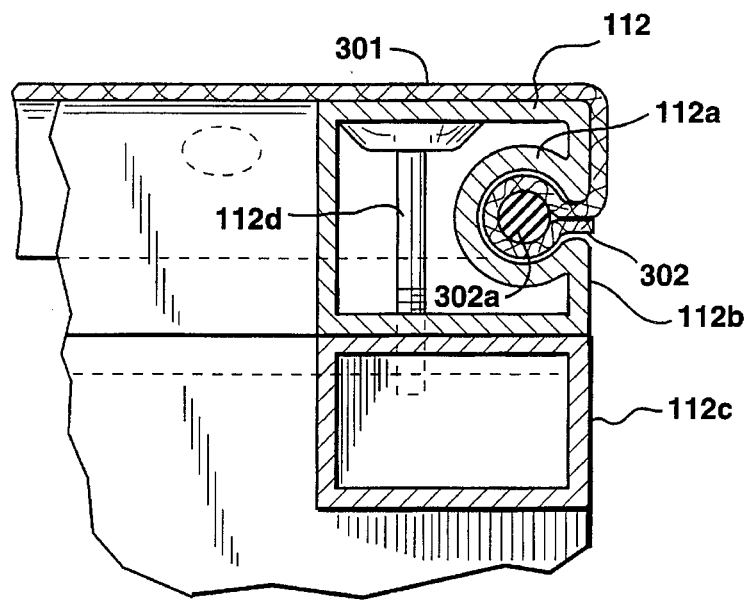
FIG. 8 is a cross-sectional view taken generally along section line 8—8 in FIG. 1 showing a first embodiment of a rail assembly for the first wall portion of a pickup truck.
Figure 34:
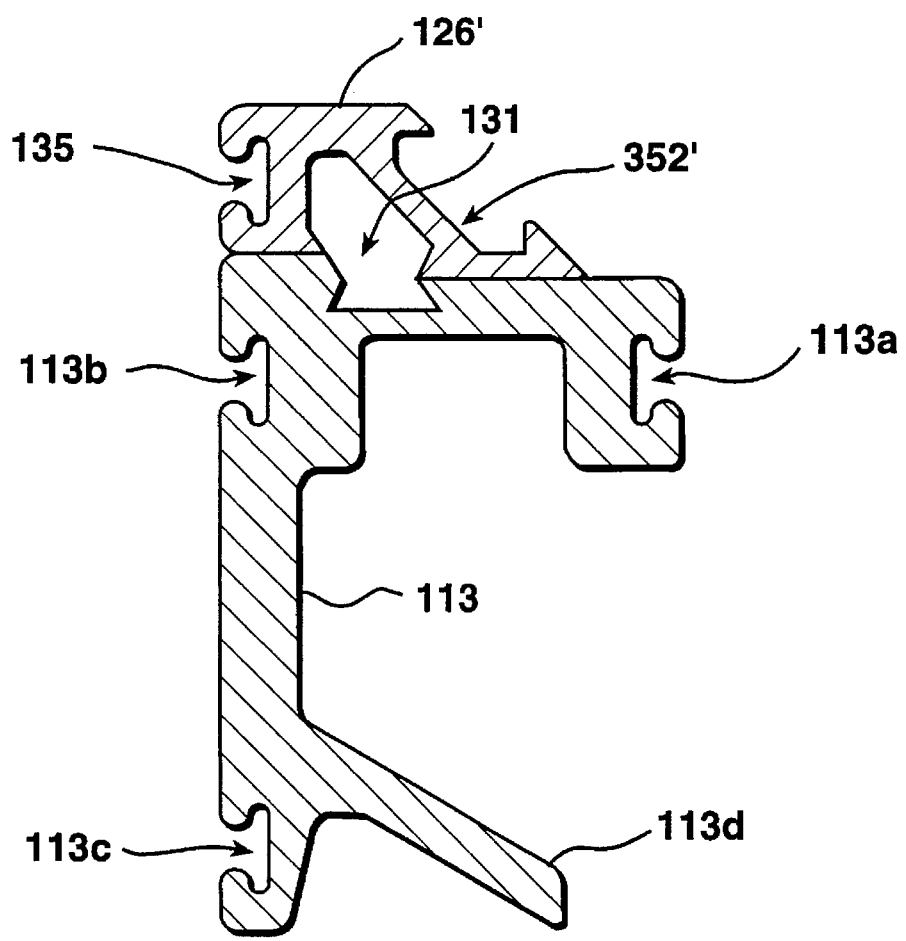
FIG. 34 is a cross-sectional view similar to that of FIG. 8 showing a second embodiment of a rail assembly for the front wall portion of the bed of a pickup truck.

The attachment means 309 further comprises an interlocking rod or cord 302a, shown in FIG. 8 (which also shows a first embodiment of the front rail member), which is sewn or otherwise attached to the front edge 302 of the cover 301. The rod or cord 302a is received within a mating recess 112a of a front rail member 112 for connecting the front edge 302 of the cover 301 to the front rail member 112, which is formed from first and second rail members 112b and 112c which are connected to one another by one or more bolts 112d. The first rail member 112b overlies the first and second base rails and the first and second fill rails. The front rail member 112 is bolted, welded, or otherwise fastened to the first and second base rails. A second embodiment of the front rail member is shown in FIG. 34, where a front unitary fill rail/base rail 113, similar to unitary fill rail/base rail 122' (see FIG. 14), has an outboard elongated channel 113a and inboard elongated channels 113b and 113c therein. A cap rail 126' is joined to front unitary fill rail/base rail 113 in the manner previously described. In this embodiment channel 352' in cap rail 126' is used to attach the tonneau cover in the same manner shown in FIGS. 11–12. Extended portion 113d of front unitary fill rail/base rail 113 is used to wedge the truck bed liner 166' against the front wall of the truck bed body. The front unitary fill rail/base rail 113 likewise overlies the first and second unitary fill rail/base rails and is attached thereto.

For providing additional security for the bed 200, the attachment means 309 further comprises a plurality of cross bar members 322, shown in FIG. 9. Each end 322a of the cross bar members 322 is provided with first and second locking pins 324 and 326, respectively, which are received within angled slots 328a of brackets 328. The brackets 328 are secured along the first and second cap rails by bolts 328b. Provided on the underside 301a of the cover 301 is a plurality of wrap-around securing elements 330, formed from waterproof cloth or the like. Each securing element 330 is sewn or otherwise fastened to the underside 301a of the cover 301 and positioned to wrap-around and lock with a corresponding cross bar member 322. First and second snap elements 330a and 330b are provided on the wrap-around elements 330 to secure each element 330 to its corresponding cross bar member 322. Thus, by manually fastening together the first and second snap elements 330a and 330b on each wrap-around element 330, the wrap-around elements 330, and hence the cover 301, are secured to the cross bar members 322. The cross bar members 322 are, in turn, locked into position when they are inserted into angled slots 328a. This results as shown in FIG. 9 because the angled slots 328a, which receive the first and second locking pins 324 and 326 of the cross bar members 322, are sloped so that their entrances 328a' are positioned away from the hatch assembly 150 which is generally shown in FIG. 1.

Figure 11:
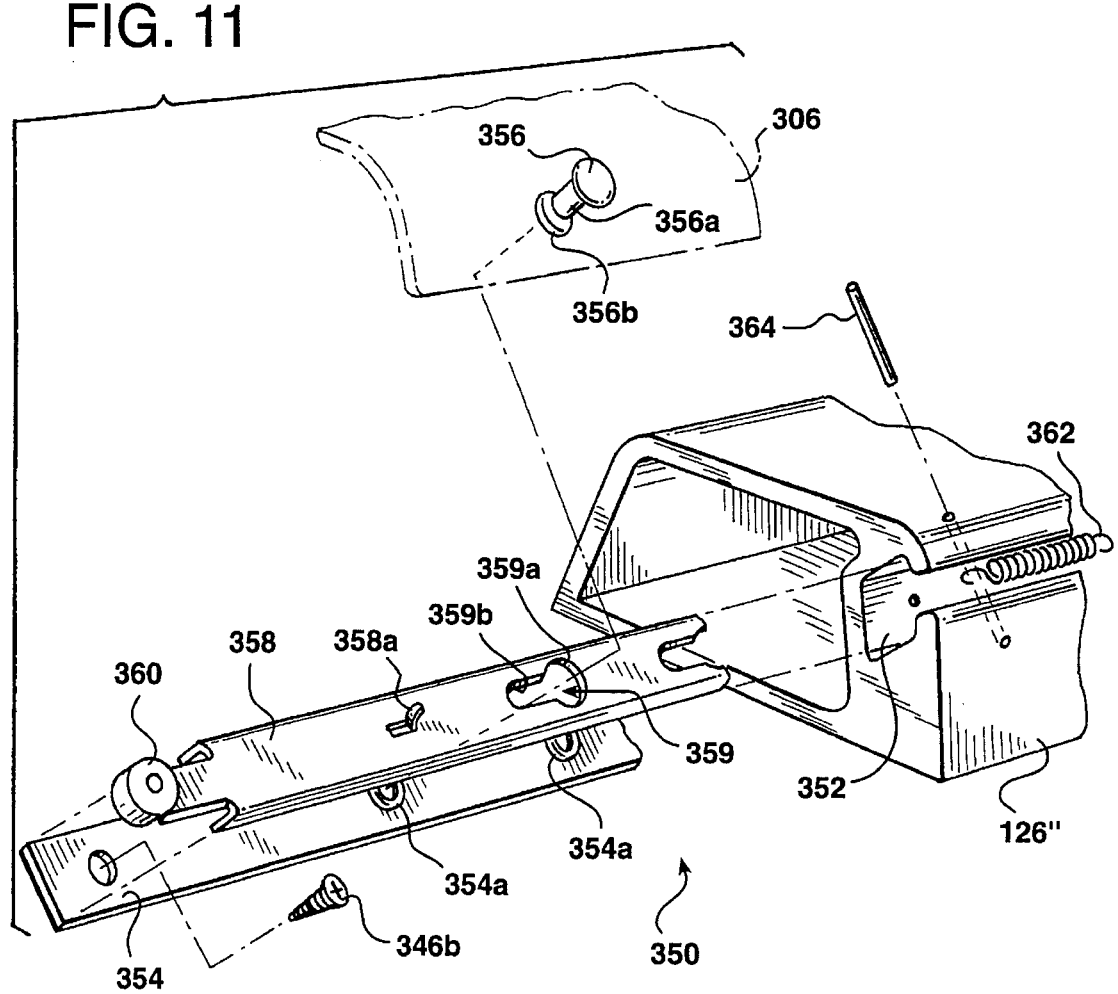
FIG. 11 is an exploded, perspective view of attachment means of a second attachment means embodiment of the present invention.
Figure 12:
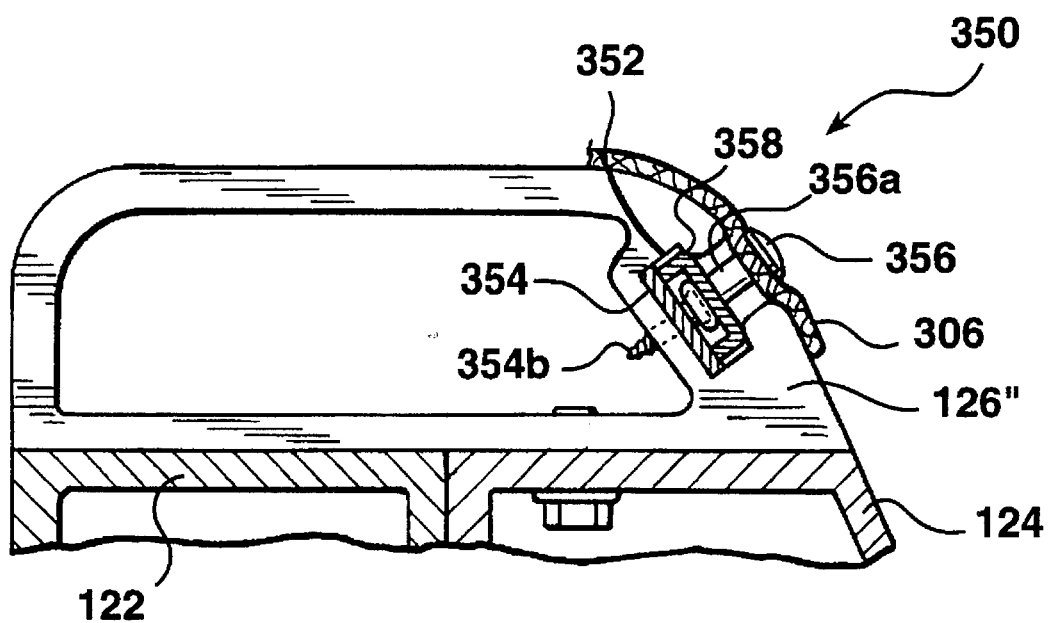
FIG. 12 is a cross-sectional view of the attachment means of the second attachment means embodiment of the present invention.

FIGS. 11–12, where like reference numerals indicate like elements, show a second attachment means embodiment with attachment means 350 for securing the cover 301 to the rail means. The attachment means 350 is a further modified attachment means of the type shown in FIGS. 2 and 9. Attachment means 350 is shown in FIGS. 14, 11, and 12. As shown in FIGS. 11 and 12, cap rail 126" includes a recess 352 capable of receiving a first elongated strip 354 having a plurality of first male rail snap elements 354a fixedly positioned along its length. The strip 354 is secured within the recess 352 by screws 354b or like fasteners. A plurality of female cover snap elements 356 are positioned along corresponding portions of the first and second side edges 306 and 308 of the cover 301. Each cover snap element 356 includes an elongated intermediate section 356a which, with or without a separate spacer, provides space for movement of locking strip 358 as described below and each cover snap element 356, and an engaging base section 356b, as shown in FIG. 11.

A first translating locking strip 358 is likewise received within the recess 352. Spaced along the length of the strip 358 are a plurality of locking apertures 359 having a receiving portion 359a and a locking portion 359b. The strip 358 further includes a cam follower surface 360.

When the hatch assembly 150 is in the "up" position, as shown in FIG. 1, the strip 358 is biased toward the hatch assembly 150. While the hatch assembly 150 is in the "up" position, the cover snap elements 356 may be fastened to or unfastened from the rail snap elements 354a through the receiving portions 359a of apertures 359. When the hatch assembly 150 is in the "down" position, a corner portion of the frame engages with the cam follower 360 and acts to overcome the force of spring 362 (which may be connected to cap rail 126" by pin 364 which also serves as a stop mechanism for catch 358 a on strip 358) and to push the strip 358 away from the hatch assembly 150 to its "locking" position. When the strip 358 is in its "locking" position, the locking portions 359b of the apertures 359 engage with the elongated sections 356a of the cover snap elements 356 to lock the base sections 356b of the snap elements 356 in fastened engagement with corresponding rail snap elements 354a, thereby securing the cover 301 to the rail means 110.

The second cap rail (not shown) is formed in the same manner as cap rail 126' or 126". Furthermore, it includes a second elongated strip and a second translating strip, which are constructed in essentially the same manner as strips 354 and 358 shown in FIG. 11.

The attachment means 350 preferably further includes permanent fasteners, such as screw fasteners or rivets (not shown), for lockingly connecting the cover 301 to the hatch assembly 150. Alternatively, male and female snap elements may be employed for connecting the cover 301 to the hatch assembly 150. The attachment means 350 also preferably includes an interlocking rod or cord 302a for connecting the front edge 302 of the cover 301 to the rail means 110. Cross bar members 322 which extend across the truck bed 200 may additionally be provided for center support of the cover 301.

With reference to FIGS. 15–19, there is shown an attachment 153 having inboard mating portions 155 and 157 which fit into inboard channels 145 and 147 of unitary fill rail/base rail 122'. Attachment 153, then, serves as a male post to which various accessories are attached. It may be fixed at any desired point along the elongated rail assembly, and multiple ones may be used. For example two such male posts formed by two attachments 153 will accommodate the female portions 161 and 163 of advertising panel 165 or female portions 167 and 169 of motorcycle rack 171. Four such male posts formed by four attachments 153, two positioned in the first rail assembly and two in the second rail assembly, will accommodate the female portions 173 a–d of ladder rack 175. Finally, any desired number of such male posts formed from the required number of attachments 153 may be used to accommodate female posts 177 to support a portable work bench 179.

With reference to FIGS. 20–24, there is shown a mating portion 189 in outboard channel 123 of unitary fill rail/base rail 122'. An appropriate number, four in these instances, of such mating portions, shown as 189a–d, are used to attach either a simulated roll bar 191 or a headache rack cab protection system 193, or a cab extender 195, or an airfoiler 197, or other accessory. FIG. 30 shows a unitary fill rail/base rail 122' with a mating portion 185 in outboard channel 123. An appropriate member, four in these instances, of such mating portions, shown as 185a–d, are used to attach either a bicycle rack 187 (see FIG. 31) or a ski/surfboard rack 181 (see FIG. 32).

In FIGS. 25–26, there is shown a mating portion 199, or series thereof, for tie-down members 201 and 203, in the outboard channel of the first and second unitary fill rail/base rails such as outboard channel 123 of unitary fill rail/base rail 122' as illustrated.

FIG. 27 shows unitary fill rail/base rail 122' with a protective rail cap 205 having mating portions 207 and 209 which fit into channels 123 and 133 thereof. Also shown in FIG. 27 is a heavy duty tie-down ring 211 having four mating portions 211 a–d, two of which fit in inboard channel 145 and two of which fit in inboard channel 147 of unitary fill rail/base rail 122'. It may be fixed at any desired point along the elongated rail assembly. Multiple ones may be used.

Figure 28:
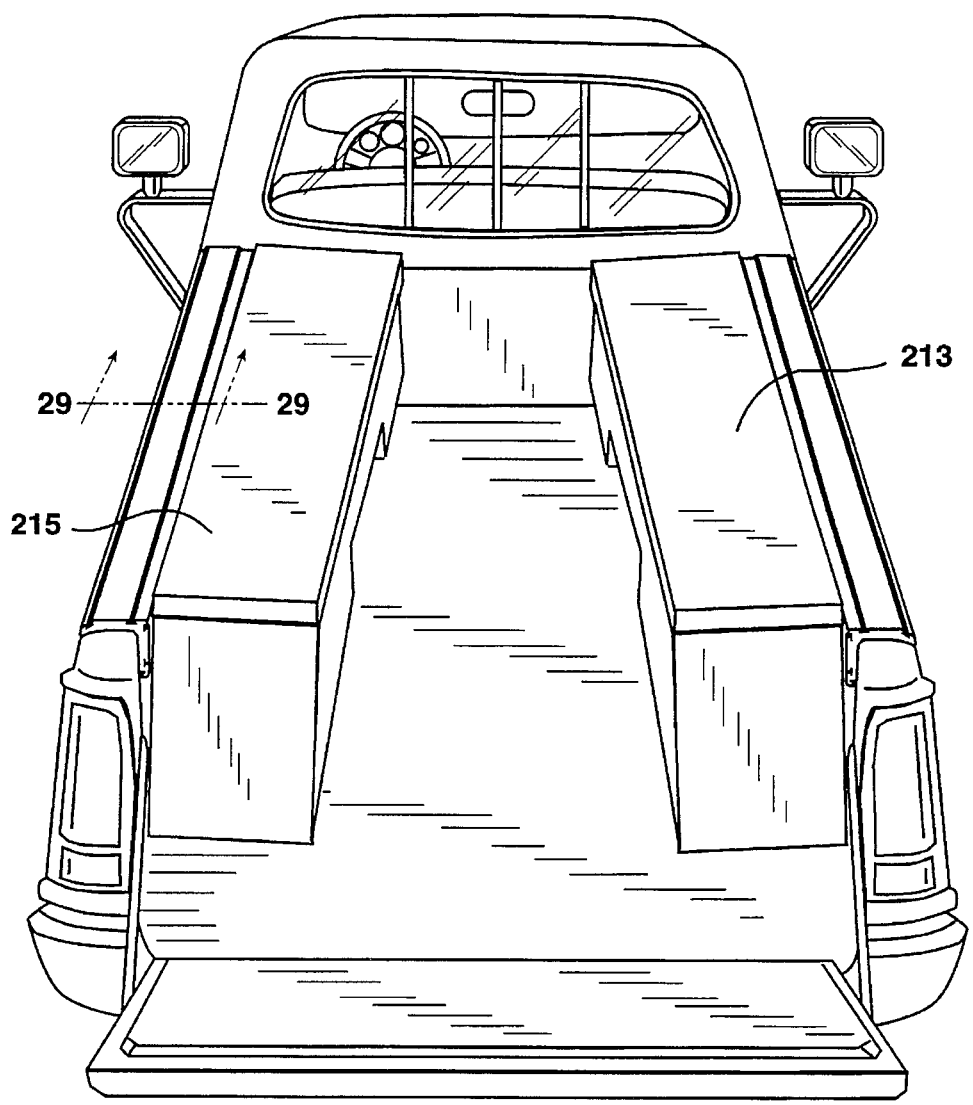
FIG. 28 is a perspective view of the rail system of the present invention mounted into the bed of a pickup truck and including cargo compartments connected to the rail means.
Figure 29:
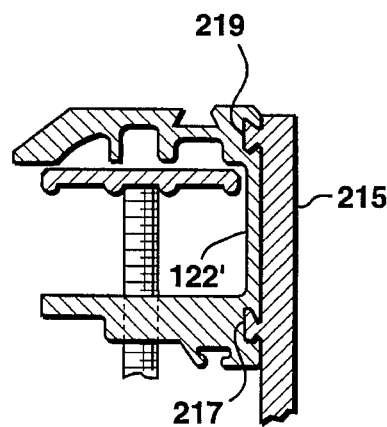
FIG. 29 is a cross-sectional view taken generally along section line 29—29 in FIG. 28.

FIGS. 28 and 29 illustrate the means for attachment of side mounted cargo components 213 and 215 to the rail system of the FIG. 14 embodiment. As shown in FIG. 29 mating portions 217 and 219 for cargo compartment 215 fit into inboard channels 145 and 147 of unitary fill rail/base rail 122'.

Figure 13:
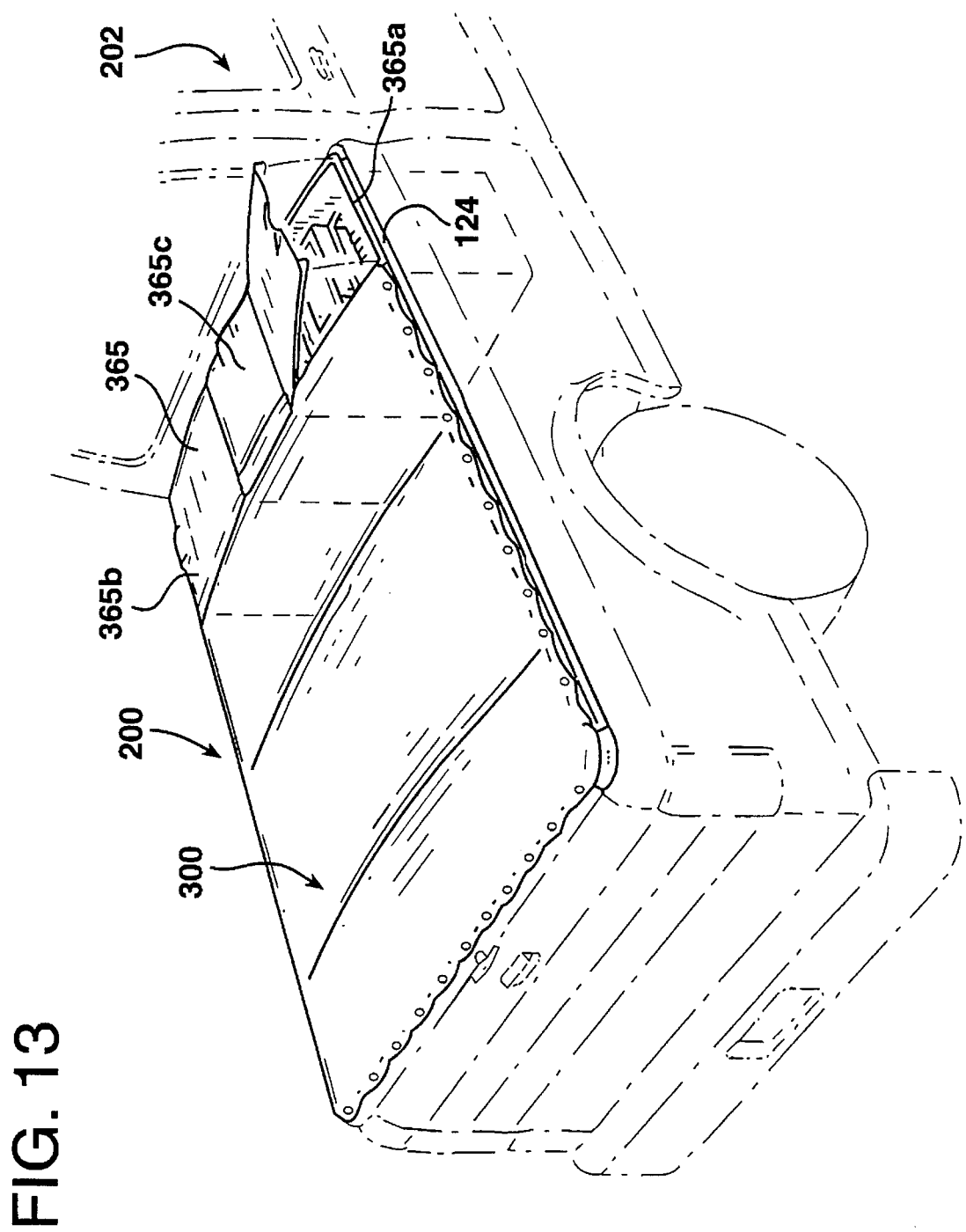
FIG. 13 is a perspective view of the rail system of the present invention mounted onto the bed of a pickup truck and including a utility box connected to the rail means.

It is further contemplated by the present invention, that a utility box 365 may overlie and be fixed to the rail means 110, as shown in FIG. 13. Portions of the first and second cap rails are removed so that the opposite end portions 365a and 365b of the utility box 365 may rest directly upon the base rails and the fill rails. The utility box 365 is preferably secured to the base rails via bolts or like fasteners through the inside of the box 365. It is further contemplated by the present invention that the utility box 365 may include an ice chest 365c positioned therein.

It is also contemplated by the present invention that a bulkhead 370 made from a net material or the like, shown in FIG. 1, may be pivotally connected to the first and second rail assemblies by, for example, a pivot rod (not shown) extending between the two assemblies.

Finally, as shown in FIG. 33, mating portions 221a–c fit into channel 129 of the unitary fill rail/base rail 122' (see FIG. 14) to hold track 221 in a position below the rail assembly. Track 221 is, then, used to slidably receive roller or slide attachments for a hard shell 223 so that the hard shell can be slid into place on the truck bed. Such a track slide system may also be used to attach a hard tonneau cover, a camper top, etc. Generally, the edge of the hard shell, hard tonneau cover, or camper top simply rests on the top of unitary fill rail/base rail 122'; mating portions for channels 123 and 133 could also be provided.

Having described the invention in detail and by reference to preferred embodiments thereof, it will be apparent that modifications and variations are possible without departing from the scope of the invention defined in the appended claims.

What is claimed is:

1. A modular rail system for supporting at least one accessory on a pickup truck bed including a front wall, an end wall, and opposing first and second side walls, the side walls each having a generally horizontal top surface, the system comprising:

a first elongated rail assembly releasably connecting with said first side wall, said first elongated rail assembly including a first unitary fill rail/base rail having an inner surface and an outer surface, at least one first outboard elongated channel in the outer surface of said first unitary fill rail/base rail for receiving a mating portion of a first accessory or a first attachment for an accessory, and at least two first inboard elongated channels in the inner surface of said first unitary fill rail/base rail for receiving a mating portion of a second accessory or a second attachment for an accessory, and a second elongated rail assembly releasably connecting with said second side wall, said second elongated rail assembly including a second unitary fill rail/base rail having an inner surface and an outer surface, at least one second outboard elongated channel in the outer surface of said second unitary fill rail/base rail for receiving the mating portion of said first accessory or said first attachment for an accessory, and at least two second inboard elongate channels in the inner surface of said second unitary fill rail/base rail for receiving the mating portion of said second accessory or said second attachment for an accessory.

2. The modular rail system as set forth in claim 1, further including a first cap rail attached to said first unitary fill rail/base rail, said first cap rail being elongated and having an inner and an outer surface, with a first elongated outboard channel in the outer surface of said first cap rail and a first elongated inboard channel in the inner surface of said first cap rail, and further including a second cap rail attached to said second unitary fill rail/base rail, said second cap rail being elongated and having an inner and an outer surface, with a second elongated outboard channel in the outer surface of said second cap rail and a second elongated inboard channel in the inner surface of said second cap rail.

3. The modular rail system as set forth in claim 2 wherein said first elongated outboard channel in the outer surface of said first cap rail and said second elongated outboard channel in the outer surface of said second cap rail are capable of receiving the mating portion of a third accessory, said third accessory being a tonneau cover.

4. The modular rail system as set forth in claim 1 wherein said first outboard elongated channel and said second outboard elongated channel receive the mating portion of the first accessory and wherein the first accessory is selected from the group consisting of a protective rail cap, a decorative strip, a light strip, and a tie-down bar.

5. The modular rail system as set forth in claim 1 wherein said first attachment for an accessory has at least two mating portions, one of which is fitted into said first outboard elongated channel and another of which is fitted into said second outboard elongated channel.

6. The modular rail system as set forth in claim 5 wherein the accessory attached to said first attachment for an accessory is selected from the group consisting of a simulated roll bar, a headache rack cab protection system, a ski rack, a bicycle rack, a cab extender, and an airfoiler.

7. The modular rail system as set forth in claim 1 wherein said second attachment for an accessory is adapted to receive an accessory selected from the group consisting of a ladder rack, an advertising panel, a portable work bench, and a motorcycle rack.

8. The modular rack system as set forth in claim 1 wherein said second accessory has at least two mating portions, one of which is fitted into one of said at least two first inboard elongated channels and another of which is fitted into another of said at least two first inboard elongated channels.

9. The modular rail system as set forth in claim 8 wherein said second accessory is selected from the group consisting of a cargo compartment and a heavy duty tie-down ring.

* * * * *